US012780457B2

(12) United States Patent
Kitagawa

(10) Patent No.: US 12,780,457 B2
(45) Date of Patent: Nov. 3, 2026

(54) UNMANNED AERIAL VEHICLE INCLUDING POWER SOURCE AND POWER SUPPLY TO SUPPLY EXTERNAL POWER FROM POWER SOURCE TO AN IMPLEMENT

(71) Applicant: Kubota Corporation, Osaka (JP)

(72) Inventor: Hiroshi Kitagawa, Ota (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 19/246,743

(22) Filed: Jun. 24, 2025

(65) Prior Publication Data

US 2025/0313358 A1 Oct. 9, 2025

Related U.S. Application Data

(63) Continuation of application No. PCT/JP2022/048180, filed on Dec. 27, 2022.

(51) Int. Cl.

*B64U 20/80* (2023.01)
*B64U 10/14* (2023.01)
*B64U 50/19* (2023.01)
*B64U 50/33* (2023.01)

(52) U.S. Cl.

CPC ............. *B64U 20/80* (2023.01); *B64U 10/14* (2023.01); *B64U 50/19* (2023.01); *B64U 50/33* (2023.01)

(58) Field of Classification Search

CPC ........ B64U 50/19; B64U 50/20; B64U 50/30; B64U 50/33; B64U 50/11; B64U 2101/40; B64D 27/33

See application file for complete search history.

(56) References Cited

U.S. PATENT DOCUMENTS

| | | | | |
|---|---|---|---|---|
| 9,764,837 | B2 * | 9/2017 | Phan | B64D 1/08 |
| 11,161,608 | B2 * | 11/2021 | Namgoong | G05D 1/101 |
| 11,294,369 | B2 * | 4/2022 | Lee | G05D 1/0038 |
| 12,014,641 | B2 * | 6/2024 | Wake | G08G 5/57 |
| 2016/0137304 | A1 | 5/2016 | Phan et al. | |
| 2016/0307448 | A1 | 10/2016 | Salnikov et al. | |
| 2018/0009529 | A1 | 1/2018 | Phan et al. | |
| 2018/0150073 | A1 * | 5/2018 | Lee | B64U 10/13 |
| 2018/0229606 | A1 | 8/2018 | Vondrell et al. | |
| 2021/0110724 | A1 * | 4/2021 | Wake | B64D 1/18 |
| 2021/0253240 | A1 | 8/2021 | Beck et al. | |
| 2023/0322423 | A1 | 10/2023 | Kinoshita et al. | |
| 2025/0276800 | A1 * | 9/2025 | Yoshioka | B64D 17/80 |
| 2025/0287876 | A1 * | 9/2025 | Sakaguchi | B64U 30/20 |
| 2025/0296682 | A1 * | 9/2025 | Kashiwagi | B64D 9/00 |

(Continued)

FOREIGN PATENT DOCUMENTS

| | | | |
|---|---|---|---|
| EP | 2762704 | A1 | 8/2014 |
| JP | 5508604 | B2 | 6/2014 |
| JP | 2018131197 | A | 8/2018 |

(Continued)

OTHER PUBLICATIONS

International Search Report in PCT/JP2022/048180 mailed Feb. 21, 2023, 6 pages.

*Primary Examiner* — Arfan Y. Sinaki
(74) *Attorney, Agent, or Firm* — Keating & Bennett, LLP

(57) ABSTRACT

An unmanned aerial vehicle includes a plurality of rotors, a power source, and a power supply to supply external power from the power source to an implement.

7 Claims, 21 Drawing Sheets

(56) References Cited

U.S. PATENT DOCUMENTS

| | | | | |
|---|---|---|---|---|
| 2025/0296683 | A1 * | 9/2025 | Torimoto ................. | B64D 1/22 |

FOREIGN PATENT DOCUMENTS

| | | | | |
|---|---|---|---|---|
| JP | 2019501057 | A | | 1/2019 |
| JP | 2020037377 | A | | 3/2020 |
| JP | 6837254 | B2 | | 3/2021 |
| JP | 2022020282 | A | * | 2/2022 |
| JP | 2022104737 | A | | 7/2022 |

* cited by examiner

*FIG. 7*

MULTI-COPTER C

MULTI-COPTER B

MULTI-COPTER A

| DATE | TIME | FIELD | TASK | IMPLEMENT |
|---|---|---|---|---|
| APRIL 22, 2021 | 8:00 - 11:00 | FIELD #1 | TILLING | IMPLEMENT A |
| APRIL 22, 2021 | 12:00 - 14:00 | FIELD #2 | TILLING | IMPLEMENT A |
| APRIL 22, 2021 | 15:00 - 18:00 | FIELD #3 | TILLING | IMPLEMENT A |
| APRIL 23, 2021 | 8:00 - 11:00 | FIELD #4 | TILLING | IMPLEMENT B |
| APRIL 23, 2021 | 12:00 - 14:00 | FIELD #5 | TILLING | IMPLEMENT B |
| APRIL 23, 2021 | 15:00 - 18:00 | FIELD #6 | TILLING | IMPLEMENT C |
| ⋮ | ⋮ | ⋮ | ⋮ | ⋮ |

UNMANNED AERIAL VEHICLE INCLUDING POWER SOURCE AND POWER SUPPLY TO SUPPLY EXTERNAL POWER FROM POWER SOURCE TO AN IMPLEMENT

CROSS REFERENCE TO RELATED APPLICATIONS

This application claims the benefit of priority to Continuation Application of PCT Application No. PCT/JP2022/048180 filed on Dec. 27, 2022. The entire contents of this application are hereby incorporated herein by reference.

BACKGROUND OF THE INVENTION

1. Field of the Invention

The present disclosure relates to unmanned aerial vehicles.

2. Description of the Related Art

An unmanned aerial vehicle (UAV) is an aircraft that structurally cannot accommodate human occupants and is capable of flight through remote control or autonomous operation. A rotary-wing type unmanned aerial vehicle is a UAV that generates lift using propellers, namely rotary wings, which rotate around an axis. A small unmanned aerial vehicle including multiple rotary wings (Multi-Rotor UAV) is also called a "drone", "multirotor", or "multicopter", and is widely used for applications including aerial photography, surveying, logistics, and agricultural spraying.

Japanese Patent Application Publication No. 2022-104737 describes an unmanned aerial vehicle (unmanned flying body) that changes its flight position in coordination with the operation of an agricultural machine.

SUMMARY OF THE INVENTION

The maximum payload capacity (payload) and flight duration of unmanned aerial vehicles may be insufficient depending on the application, and solutions to these problems are desired.

Example embodiments of the present invention provide unmanned aerial vehicles each suitable for agricultural applications and capable of increasing payload and/or flight duration.

The present disclosure provides solutions described in the following items.

Item A1

An unmanned aerial vehicle including a plurality of first rotors, at least one second rotor, a plurality of electric motors to drive the plurality of first rotors, an internal combustion engine to drive the at least one second rotor, a battery to store first electric power, an electric generator to be driven by the internal combustion engine to generate second electric power, and a first power controller configured or programmed to control charging and discharging of the battery, and a second power controller configured or programmed to control power generation by the electric generator, wherein at least one of the first electric power and the second electric power is to be supplied to the plurality of electric motors, and the first power controller is configured or programmed to control the second power controller.

Item A2

The unmanned aerial vehicle according to Item A1, wherein the first power controller is configured or programmed to control the second power controller according to a state of the battery.

Item A3

The unmanned aerial vehicle according to Item A1, further including wiring that connects the plurality of electric motors to the electric generator and the battery, and the first power controller is configured or programmed to control an electrical connection between the wiring and the battery.

Item A4

The unmanned aerial vehicle according to any one of Items A1 to A3, wherein the first power controller is configured or programmed to control the second power controller to adjust an amount of the power generation according to work content of the unmanned aerial vehicle.

Item A5

The unmanned aerial vehicle according to any one of Items A1 to A3, wherein the first power controller is configured or programmed to control a state of charge of the battery according to flight conditions including a flight altitude of the unmanned aerial vehicle.

Item A6

The unmanned aerial vehicle according to any one of Items A1 to A5, wherein the first power controller is configured or programmed to control a state of charge of the battery according to a distance from the unmanned aerial vehicle to a possible landing point.

Item A7

The unmanned aerial vehicle according to any one of Items A1 to A3, further including a controller configured or programmed to function as both the first power controller and the second power controller.

Item B1

An unmanned aerial vehicle including a plurality of rotors, a power source, and a power supply to supply external power from the power source to an implement.

Item B2

The unmanned aerial vehicle according to Item B1, further including a plurality of electric motors each to drive a respective one of a plurality of first rotors included in the plurality of rotors, first wiring to supply power from the power source to each of the plurality of electric motors, and second wiring that branches from the first wiring to supply the external power from the power source to the power supply.

Item B3

The unmanned aerial vehicle according to Item B2, wherein the power source includes a battery to store first electric power.

Item B4

The unmanned aerial vehicle according to Item B2 or B3, further including at least one second rotor included in the plurality of rotors, an internal combustion engine to drive the at least one second rotor, and an electric generator to be driven by the internal combustion engine to generate second electric power, wherein the power source includes the electric generator, and the electric generator is connected to the first wiring and the second wiring.

Item B5

The unmanned aerial vehicle according to any one of Items B1 to B4, wherein the implement is an interchangeable implement to perform agricultural work on a field or crops in the field.

Item B6

The unmanned aerial vehicle according to any one of Items B1 to B5, wherein the power supply includes a terminal to supply power to the implement and a terminal to conduct communication with the implement.

Item B7

The unmanned aerial vehicle according to Item B6, further including a controller configured or programmed to control output of the external power from the power supply, wherein the controller is configured or programmed to control supply of the external power according to a current operational state or a planned operational state of the implement obtained through the communication.

Item B8

The unmanned aerial vehicle according to any one of Items B1 to B7, wherein the unmanned aerial vehicle is configured to fly while towing the implement, and the power supply and the implement are electrically connected by a cable.

Item C1

An unmanned aerial vehicle including a plurality of first rotors, at least one second rotor, a plurality of electric motors to respectively drive the plurality of first rotors, an internal combustion engine to drive the at least one second rotor, a battery to store first electric power, an electric generator to be driven by the internal combustion engine to generate second electric power, a controller configured or programmed to control at least one of operation of the internal combustion engine, operation of the electric motors, charging and discharging of the battery, and power generation by the electric generator, and a power supply to supply at least a portion of the first electric power and the second electric power as third electric power to an implement, wherein the controller is configured or programmed to control at least one of the operation of the internal combustion engine, the operation of the electric motors, the charging and discharging of the battery, and the power generation by the electric generator according to current operation content or planned operation content of the implement.

Item C2

The unmanned aerial vehicle according to Item C1, wherein the controller is configured or programmed to start charging the battery before start of the operation according to the planned operation content of the implement.

Item C3

The unmanned aerial vehicle according to Item C2, wherein the controller is configured or programmed to adjust a state of charge or a charge amount of the battery according to the operation content.

Item C4

The unmanned aerial vehicle according to Item C1 or C2, wherein the controller is configured or programmed to increase an amount of power generation by the electric generator before start of the operation according to the planned operation content of the implement.

Item C5

The unmanned aerial vehicle according to Item C4, wherein the controller is configured or programmed to adjust the amount of power generation according to the operation content.

Item C6

The unmanned aerial vehicle according to any one of Items C1 to C5, wherein the controller is configured or programmed to include a first power controller configured or programmed to control charging and discharging of the battery and a second power controller configured or programmed to control power generation by the electric generator.

Item C7

The unmanned aerial vehicle according to any one of Items C1 to C6, wherein the controller is configured or programmed to obtain the current operation content or the planned operation content of the implement from a work plan.

Item C8

The unmanned aerial vehicle according to any one of Items C1 to C6, wherein the controller is configured or programmed to obtain the current operation content or the planned operation content of the implement from the implement.

Item C9

The unmanned aerial vehicle according to any one of Items C1 to C8, wherein the implement is an interchangeable implement to perform agricultural work on a field or crops in the field.

Item C10

The unmanned aerial vehicle according to any one of Items C1 to C9, wherein the power supply includes a terminal to supply power to the implement and a terminal to conduct communication with the implement.

Item C11

The unmanned aerial vehicle according to any one of Items C1 to C10, wherein the unmanned aerial vehicle is configured to fly while towing the implement, and the power supply and the implement are electrically connected by a cable.

According to example embodiments of the unmanned aerial vehicles of the present disclosure, it is possible to adjust the generation and utilization of electric power required for motor rotation according to flight conditions or work content.

The above and other elements, features, steps, characteristics and advantages of the present invention will become more apparent from the following detailed description of the example embodiments with reference to the attached drawings.

BRIEF DESCRIPTION OF THE DRAWINGS

FIG. 7 is a diagram showing an example of work plans for various agricultural work.

DETAILED DESCRIPTION OF THE EXAMPLE EMBODIMENTS

An unmanned aerial vehicle including a plurality of rotors includes a rotation driver to rotate the rotors (hereinafter referred to as "propellers"). Hereinafter, such an unmanned aerial vehicle is referred to as a "multicopter".

Figure 1A:
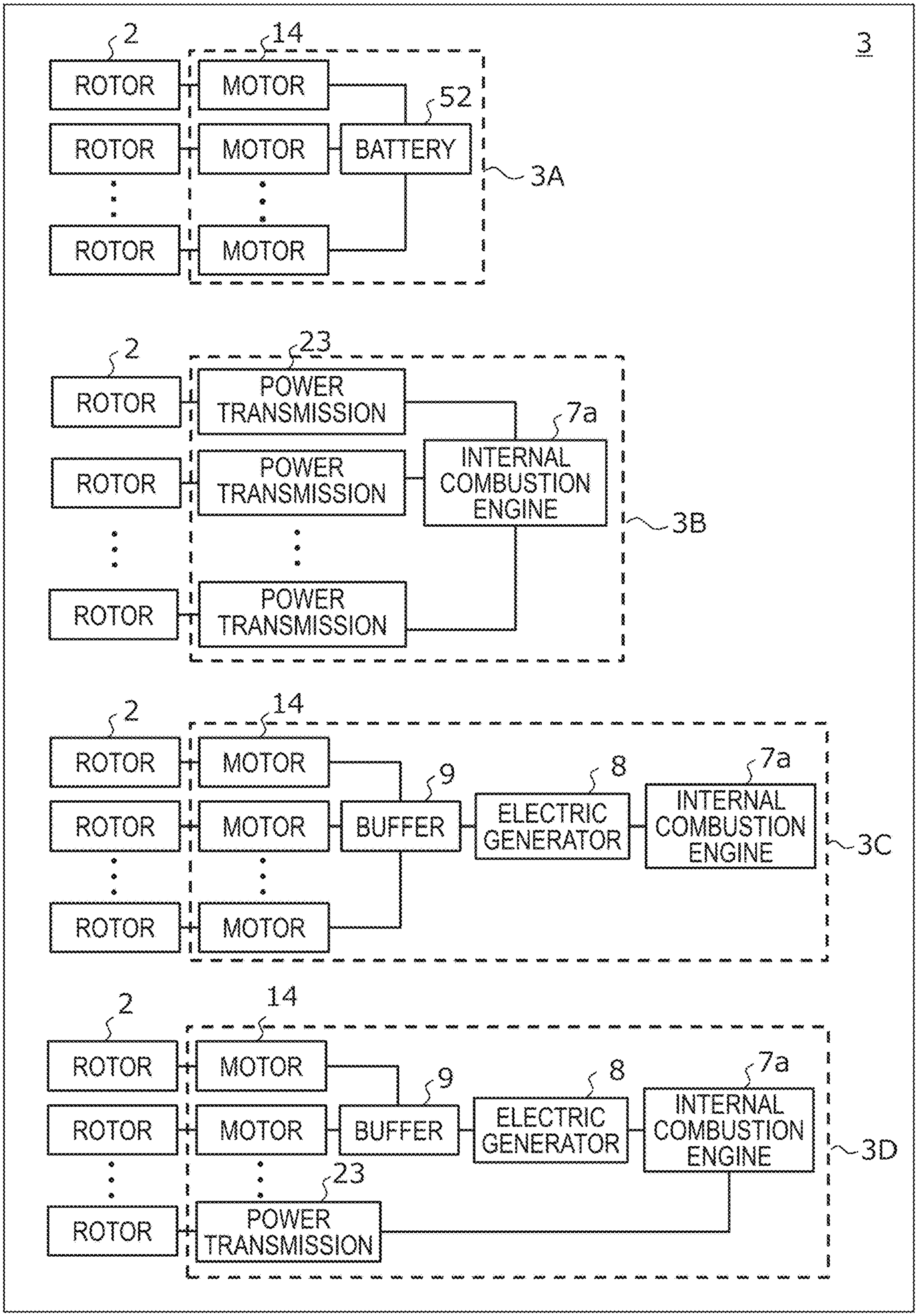
FIG. 1A is a block diagram schematically showing several examples of rotation drivers to rotate rotors in an unmanned aerial vehicle including a plurality of rotors.

The configuration of rotation drivers included in multicopters exists in various forms. FIG. 1A is a schematic block diagram showing four examples of rotation driver 3 in the present disclosure.

The first rotation driver 3A shown in FIG. 1A includes a plurality of electric motors (hereinafter referred to as "motors") 14 to rotate a plurality of rotors 2, and a battery 52 to store electric power to be supplied to each motor 14. The battery 52 is, for example, a secondary battery such as a polymer-type lithium-ion battery. Each rotor 2 is connected to the output shaft of its corresponding motor 14 and is rotated by the motor 14. To increase payload and/or flight duration, it is necessary to increase the power storage capacity of battery 52. While the power storage capacity of battery 52 can be increased by making battery 52 larger, enlarging battery 52 leads to an increase in weight.

The second rotation driver 3B shown in FIG. 1A includes a power transmission system 23 mechanically connected to rotor 2, and an internal combustion engine 7*a* to provide a driving force (torque) to power transmission system 23. The power transmission system 23 includes mechanical components such as gears or belts and transmits torque from the output shaft of internal combustion engine 7*a* to rotor 2. The internal combustion engine 7*a* can efficiently generate mechanical energy through fuel combustion. Examples of internal combustion engine 7*a* may include gasoline engines, diesel engines, and hydrogen engines. Additionally, the number of internal combustion engines 7*a* included in rotation driver 3B is not limited to one.

The third rotation driver 3C shown in FIG. 1A includes a plurality of motors 14, a power buffer 9 that stores electric power to be supplied to each motor 14, an electric generator 8 such as an alternator that generates electric power, and an internal combustion engine 7*a* that provides mechanical energy for power generation to the electric generator 8. While a typical example of power buffer 9 is a battery such as a secondary battery, it may also be a capacitor. In the third rotation driver 3C, even when the power buffer 9 does not have a large power storage capacity, it is possible to increase payload and/or flight duration because the electric generator 8 generates electric power using the driving force (mechanical energy) of internal combustion engine 7*a*. This type of drive is called "series hybrid drive". The electric generator 8 and internal combustion engine 7*a* in the series hybrid drive are called a "range extender" as they extend the flight distance of the multicopter.

The fourth rotation driver 3D shown in FIG. 1A includes a plurality of motors 14, a power buffer 9 that stores electric power to be supplied to each motor 14, an electric generator 8 such as an alternator that generates electric power, an internal combustion engine 7*a* that provides driving force to the electric generator 8 for power generation, a power transmission system 23 that transmits a driving force generated by the internal combustion engine 7*a* to the rotor 2 to rotate the rotor 2. At least one rotor 2 of the plurality of rotors 2 is rotated by the internal combustion engine 7*a*, while other rotors 2 are rotated by the motor 14. In the fourth rotation driver 3D, since mechanical energy generated by internal combustion engine 7*a* can be utilized for rotor rotation without conversion to electrical energy, energy utilization efficiency can be enhanced. This type of drive is called "parallel hybrid drive".

Figure 1B:
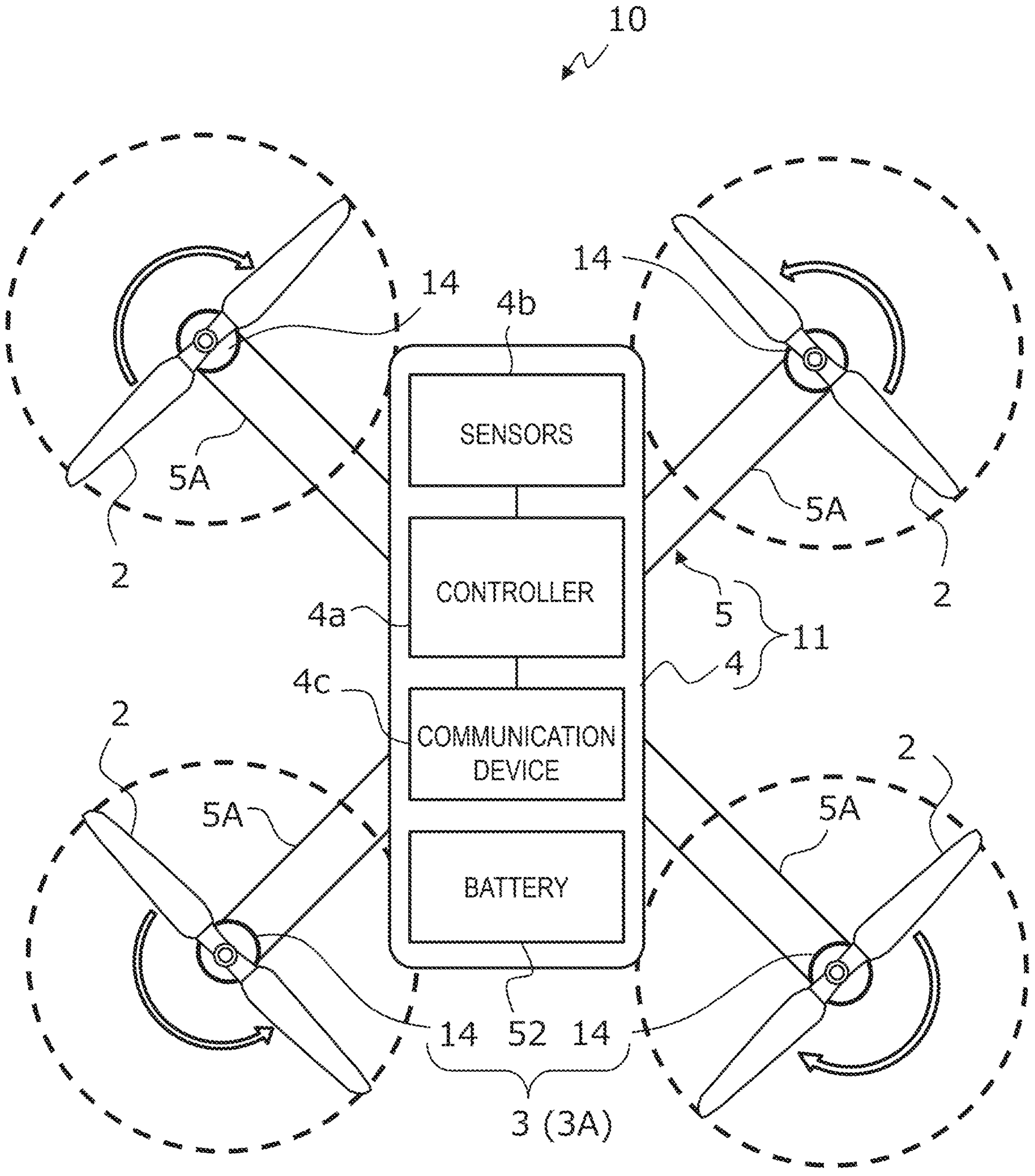
FIG. 1B is a plan view schematically showing one example of a basic configuration of an unmanned aerial vehicle including a plurality of rotors.
Figure 1C:
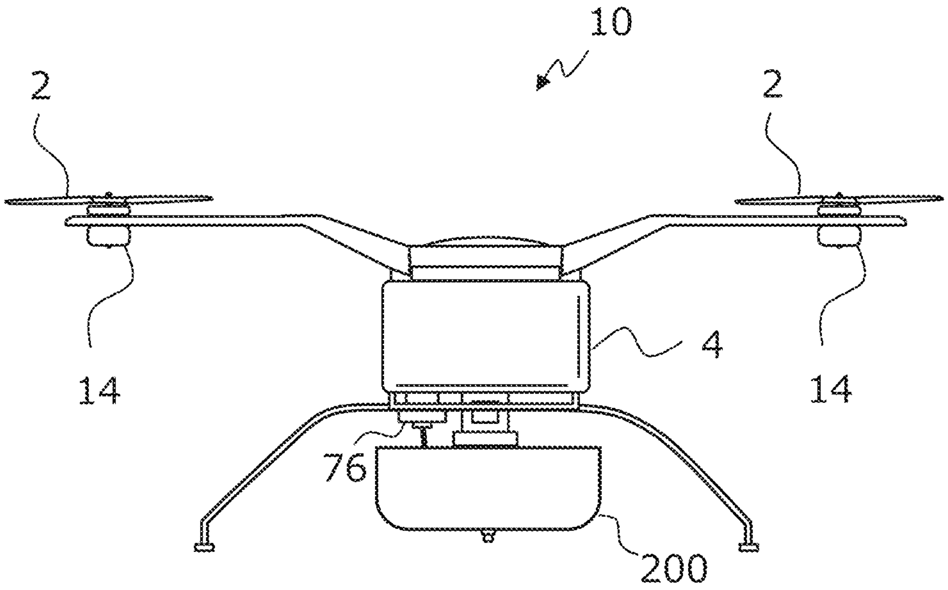
FIG. 1C is a side view schematically showing one example of a basic configuration of an unmanned aerial vehicle including a plurality of rotors.

FIG. 1B is a plan view schematically showing a basic configuration example of multicopter 10. In the configuration example of FIG. 1B, a rotation driver 3 includes the first rotation driver 3A shown in FIG. 1A. That is, in this example, rotation driver 3 (3A) includes motors 14 and a battery 52. FIG. 1C is a side view schematically showing the multicopter 10.

A multicopter 10 shown in FIGS. 1B and 1C includes a plurality of rotors 2, a main body 4, and a body frame 5 that supports rotors 2 and main body 4. The body frame 5 supports the main body 4 at its central portion and supports the plurality of rotors 2 rotatably at the plurality of arms 5A extending outward from the central portion. The motors 14 that rotate rotors 2 are provided near the ends of each arm 5A. The main body 4 and body frame 5 may be collectively referred to as "body 11".

In the example of FIG. 1B, the multicopter 10 is a quad-type multicopter (quadcopter) including four rotors 2.

The rotors 2 positioned on the same diagonal line rotate in the same direction (clockwise or counterclockwise), while rotors 2 positioned on different diagonal lines rotate in opposite directions.

The main body 4 includes a controller 4*a* that controls the operation of devices and components mounted on multicopter 10, sensors 4*b* connected to the controller 4*a*, a communication device 4*c* connected to the controller 4*a*, and a battery 52.

The controller 4*a* may include, for example, a flight controller such as a flight controller and a higher-level computer (companion computer). The companion computer may perform advanced computational processing such as image processing, obstacle detection, and obstacle avoidance based on sensor data acquired by the sensors 4*b*.

The sensors 4*b* may include an acceleration sensor, angular velocity sensor, geomagnetic sensor, atmospheric pressure sensor, altitude sensor, temperature sensor, flow sensor, imaging device, laser sensor, ultrasonic sensor, obstacle contact sensor, and GNSS (Global Navigation Satellite System) receiver. The acceleration sensor and angular velocity sensor may be mounted on the main body 4 as components of an IMU (Inertial Measurement Unit). Examples of laser sensors may include a laser range finder used to measure distance to the ground, and 2D or 3D LiDAR (light detection and ranging).

The communication device 4*c* may include a wireless communication module for signal transmission and reception with a ground-based transmitter or ground control station (GCS) via an antenna, and a mobile communication module that utilizes cellular communication networks. The communication device 4*c* is configured to receive signals such as control commands transmitted from the ground and transmit sensor data such as image data acquired by sensors 4*b* as telemetry information. The communication device 4*c* may also include functions for communication between multicopters and satellite communication capabilities. The controller 4*a* may connect to computers in the cloud through the communication device 4*c*. The computer in the cloud may execute some or all of the functions of the companion computer.

A battery 52 is a secondary battery that is configured to store electric power through charging and supply electric power to motors 14 through discharging. Through the operation of battery 52 and the plurality of motors 14, a plurality of rotors 2 can be rotationally driven to generate desired thrust.

Each of the plurality of rotors 2 generally includes a plurality of blades with fixed pitch angles and generates thrust through rotation. The pitch angles may be variable. Not all of the plurality of rotors 2 need to have the same diameter (propeller diameter), and one or more rotors 2 may have a larger diameter than other rotors 2. The thrust (static thrust) generated by rotating the rotor 2 is generally proportional to the cube of the rotor's diameter. Therefore, when the rotors 2 of different diameters are provided, the rotors 2 with relatively large diameters may be called "main rotors" and the rotors 2 with relatively small diameters may be called "sub-rotors". Regardless of the size of the diameter, the rotors 2 capable of generating relatively large thrust and the rotors 2 capable of generating relatively small thrust may be included depending on the configuration of rotation driver 3. In such case, the rotors 2 capable of generating relatively large thrust may be called "main rotors" and the rotors 2 capable of generating relatively small thrust may be called "sub-rotors". For example, the rotors 2 that generate relatively large thrust per rotation may be called "main rotors" and the rotors 2 that generate relatively small thrust per rotation may be called "sub-rotors". In one example, main rotors may be positioned more inward than sub-rotors. In other words, the rotors 2 may be positioned such that the distance from the center of the body to the rotation axis of each main rotor is shorter than the distance from the center to the rotation axis of each sub-rotor.

In this example, the rotation driver 3 includes a plurality of motors 14. As mentioned above, the rotation driver 3 may include the internal combustion engine 7*a*.

Figure 1D:
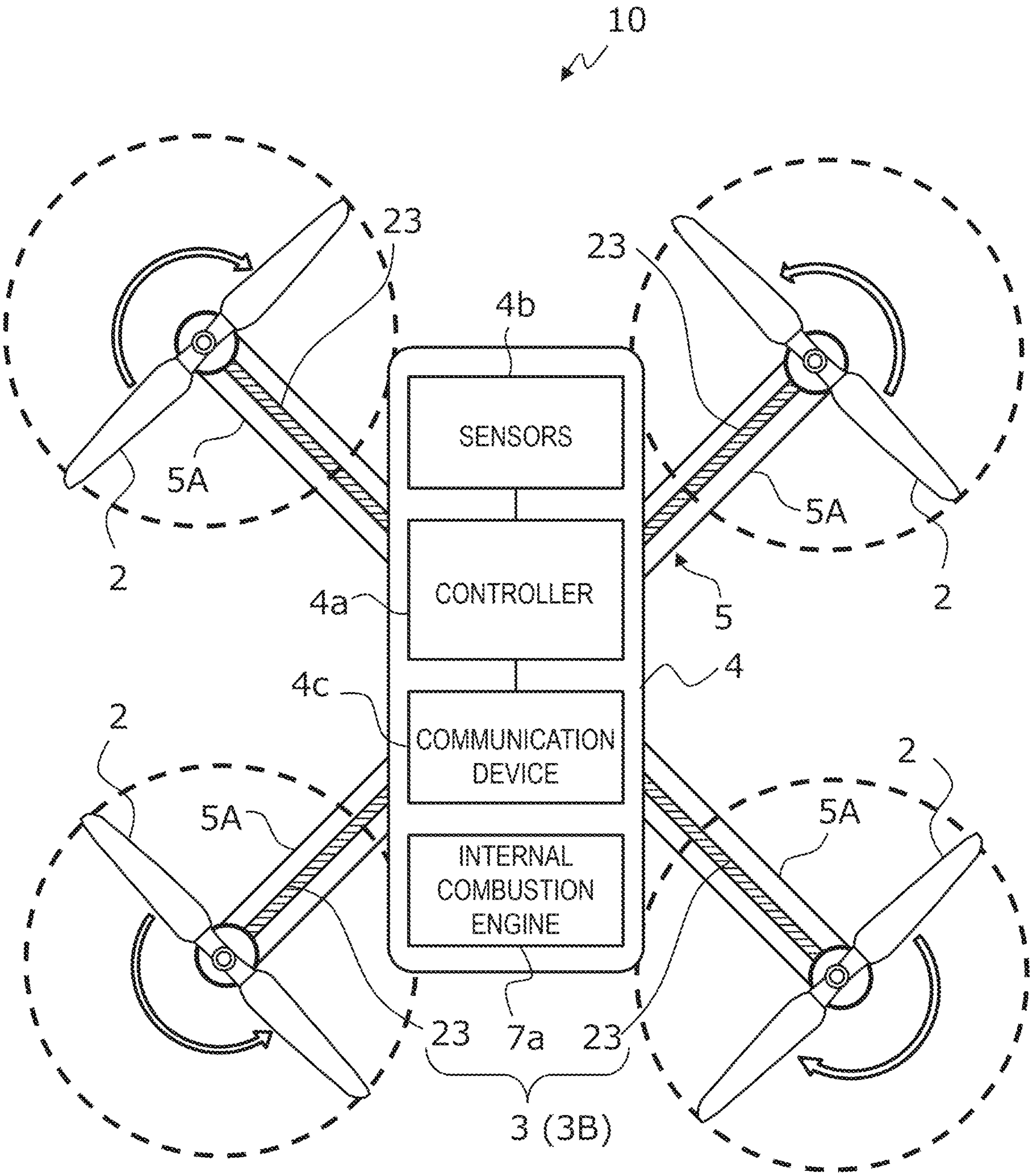
FIG. 1D is a plan view schematically showing another example of a basic configuration of an unmanned aerial vehicle including a plurality of rotors.

FIG. 1D is a plan view schematically showing a basic configuration example of a multicopter 10 including the second rotation driver 3B. In the example shown in FIG. 1D, the internal combustion engine 7*a* is supported by the main body 4. In this example, the driving force generated by internal combustion engine 7*a* is transmitted to the plurality of rotors 2 through a plurality of power transmission systems 23 to rotate each rotor 2.

The controller 4*a* may change the rotational speed of individual rotors 2 by controlling each power transmission system 23. Rotation driver 3B may include a mechanism configured to change the pitch angle of blades of each of the plurality of rotors 2. In that case, the controller 4*a* may adjust the lift generated by each rotor 2 by controlling that mechanism to change the blade pitch angles.

In a "parallel hybrid drive" where some of the plurality of rotors 2 are rotated by the internal combustion engine 7*a* and other rotors 2 are rotated by the motors 14, the internal combustion engine 7*a* and battery 52 are supported by the main body 4. At least one of the plurality of rotors 2 is connected to the internal combustion engine 7*a* through the power transmission system 23, and other rotors 2 are connected to the motors 14.

In such a parallel hybrid drive, the diameter of one or more rotors 2 rotated by the internal combustion engine 7*a* may be larger than the diameter of other rotors 2 rotated by the motors 14. In other words, the internal combustion engine 7*a* may be used for to rotate the main rotors and the motors 14 may be used for rotating the sub-rotors. In such case, the main rotors are mainly used to generate thrust, and the sub-rotors are used both to generate thrust and attitude control. The main rotors may be called "booster rotors" and the sub-rotors may be called "attitude control rotors".

In the parallel hybrid drive, the internal combustion engine is used for both thrust generation and power generation. By selectively transmitting driving force (torque) generated by the internal combustion engine to either or both of the rotor and electric generator, it is possible to achieve balanced thrust generation and power generation.

When a multicopter includes an internal combustion engine and uses the internal combustion engine for at least one of thrust generation and power generation, this contributes to increased payload and flight duration. It is desirable to perform attitude control of the multicopter by rotating propellers using motors, which have superior response characteristics compared to internal combustion engines. Therefore, in applications where accurate attitude control of the multicopter is required, it is desirable to adopt parallel hybrid drive or series hybrid drive to increase payload and flight duration. Note that when the rotation driver 3 includes a mechanism configured to change the pitch angle of blades of each of the plurality of the rotors 2, the attitude can also be adjusted by changing the pitch angle of each blade.

Through increased payload and flight duration, the applications of multicopters can be further expanded. For example, in the agricultural field, multicopters are currently being used for agricultural chemical spraying or crop growth monitoring. Various agricultural work can be performed from the air by connecting various ground work machines (hereinafter may be simply referred to as "work machines") to the multicopter. Agricultural work machines are sometimes referred to as "implements". Examples of implements may include sprayers for spraying chemicals on crops, mowers, seeders, spreaders (fertilizer applicators), rakes, balers, harvesters, plows, harrows, or rotary tillers. Work vehicles such as tractors are not included in "implements" in this disclosure.

In the example shown in FIG. 1C, an implement 200 capable of dispersing substances such as agricultural chemicals or fertilizers onto a field or crops in the field is connected to multicopter 10. Increased payload and flight duration enable the implement 200 to achieve a larger size and/or multi-functionality. For example, by changing implement 200 connected to multicopter 10, various ground operations (agricultural work) including liquid application, granular application, fertilization, thinning, weeding, transplanting, direct seeding, and harvesting can be performed. The implement 200 may include mechanisms such as robotic hands. In that case, a single implement 200 can perform various ground operations. When the implement 200 includes space large enough to store materials, such implement 200 can also transport agricultural materials or harvested crops over a wide area. There are various forms of connecting the implement 200 to the multicopter 10. The multicopter 10 may suspend and tow the implement 200 using a cable. The implement 200 towed by the multicopter 10 can perform ground operations while being towed during flight or hovering of multicopter 10. The implement 200 during operation may be in the air or on the ground.

In the example shown in FIG. 1C, the multicopter 10 includes power supply 76. The power supply 76 supplies power to the implement 200 from driving energy sources such as a battery 52 or an electric generator 8 included in the multicopter 10. Various functions of implement 200 may be performed using this power. The implement 200 includes actuators such as motors that operate using power obtained from the power supply 76 of the multicopter 10. The implement 200 preferably includes a battery to store power.

Figure 2A:
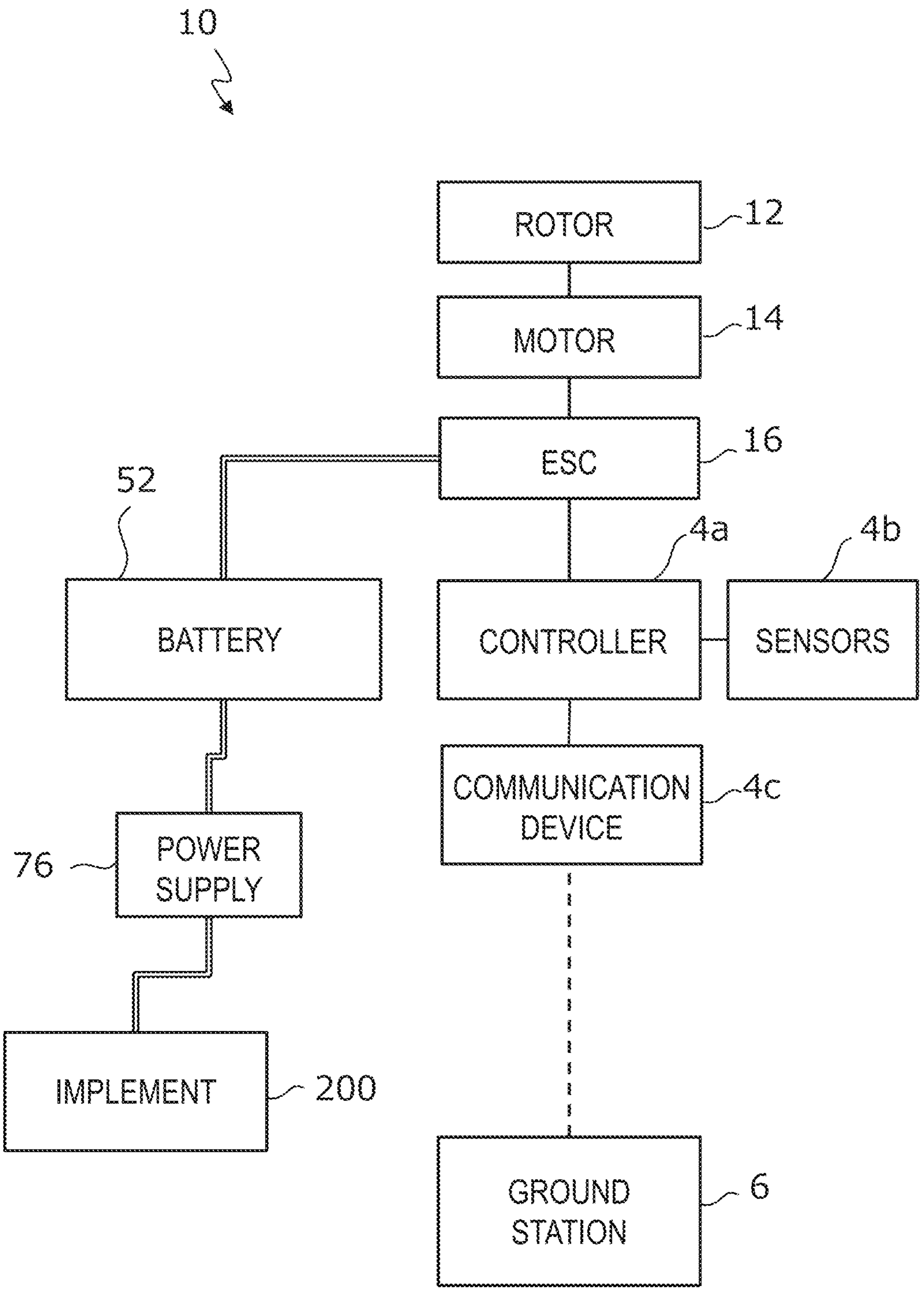
FIG. 2A is a block diagram showing a basic configuration example of a battery-driven multicopter.

FIG. 2A shows a block diagram of a basic configuration example of a battery-driven multicopter 10. The battery-driven multicopter 10 includes a plurality of rotors 12, a plurality of motors 14, each driving a respective one of the plurality of rotors 12, a plurality of ESCs (Electric Speed Controllers) 16 each including a motor drive circuit that drives a respective one of the plurality of motors 14, a battery 52 that supplies power to each of the plurality of motors 14 through each respective ESC 16, a controller 4*a* configured or programmed to control a plurality of ESCs 16 to control attitude while flying, sensors 4*b*, a communication device 4*c*, and a power supply 76 that is electrically connected to the battery 52. In FIG. 2A, for simplicity, the rotor 12, the motor 14, and the ESC 16 are each shown by a single block, but the numbers of rotors 12, motors 14, and ESCs 16 are each plural. This also applies to FIGS. 2B and 2C. The ESC 16 may be included in the controller 4*a*.

The controller 4*a* may receive control commands wirelessly from, for example, a ground station 6 on the ground through the communication device 4*c*. The number of ground stations 6 is not limited to one, and the grand station 6 may be distributed across a plurality of locations. The communication device 4*c* may also wirelessly receive control commands from an operator's controller on the ground. The controller 4*a* may have functions to automatically or autonomously execute takeoff, flight, obstacle avoidance, and landing operations based on sensor data obtained from the sensors 4*b*. The controller 4*a* may be configured or programmed to communicate with the implement 200 connected to the power supply 76 and obtain signals indicating the state of implement 200. Additionally, the controller 4*a* may provide signals to control the operation of the implement 200. Furthermore, the implement 200 may generate signals to instruct the operation of multicopter 10 and transmit them to the controller 4*a*. Such communication between the controller 4*a* and the implement 200 may be conducted through wired or wireless methods.

Figure 2B:
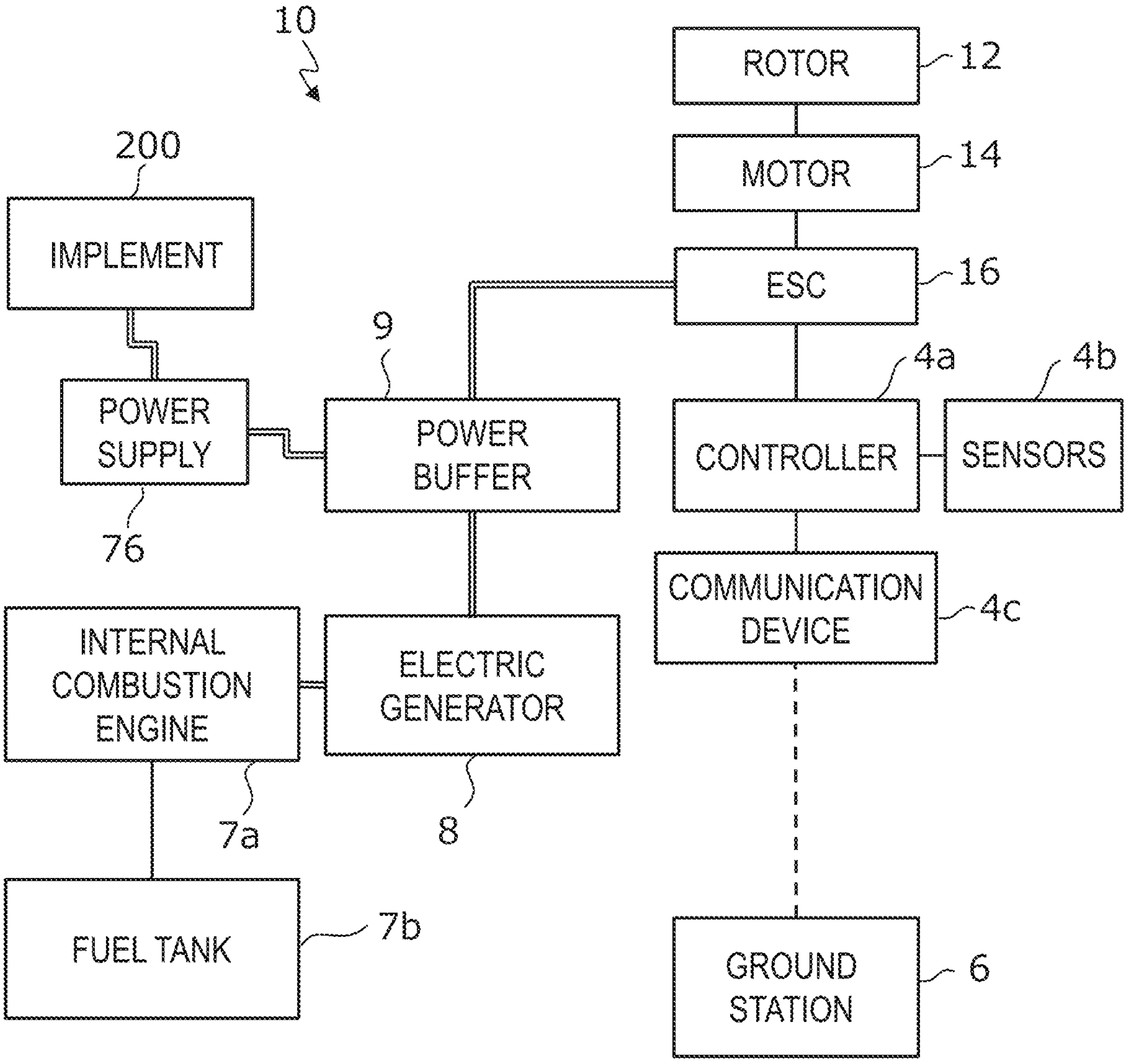
FIG. 2B is a block diagram showing a basic configuration example of a series hybrid type multicopter.

FIG. 2B is a block diagram showing a basic configuration example of a series hybrid drive type multicopter 10. Like the battery-driven multicopter 10, the series hybrid drive type multicopter 10 includes a plurality of rotors 12, a plurality of motors 14, a plurality of ESCs 16, a controller 4*a*, sensors 4*b*, and a communication device 4*c*. The series hybrid drive type multicopter 10 shown in the figure further includes an internal combustion engine 7*a*, a fuel tank 7*b* that stores fuel for the internal combustion engine 7*a*, an electric generator 8 that is driven by the internal combustion engine 7*a* to generate electric power, a power buffer 9 that temporarily stores electric power generated by the electric generator 8, and a power supply 76 that is electrically connected to the power buffer 9. The power buffer 9 is, for example, a battery such as a secondary battery. Electric power generated by the electric generator 8 is supplied to the motors 14 through the power buffer 9 and the ESCs 16. Additionally, the electric power generated by the electric generator 8 may be supplied to the implement 200 through the power supply 76.

Figure 2C:
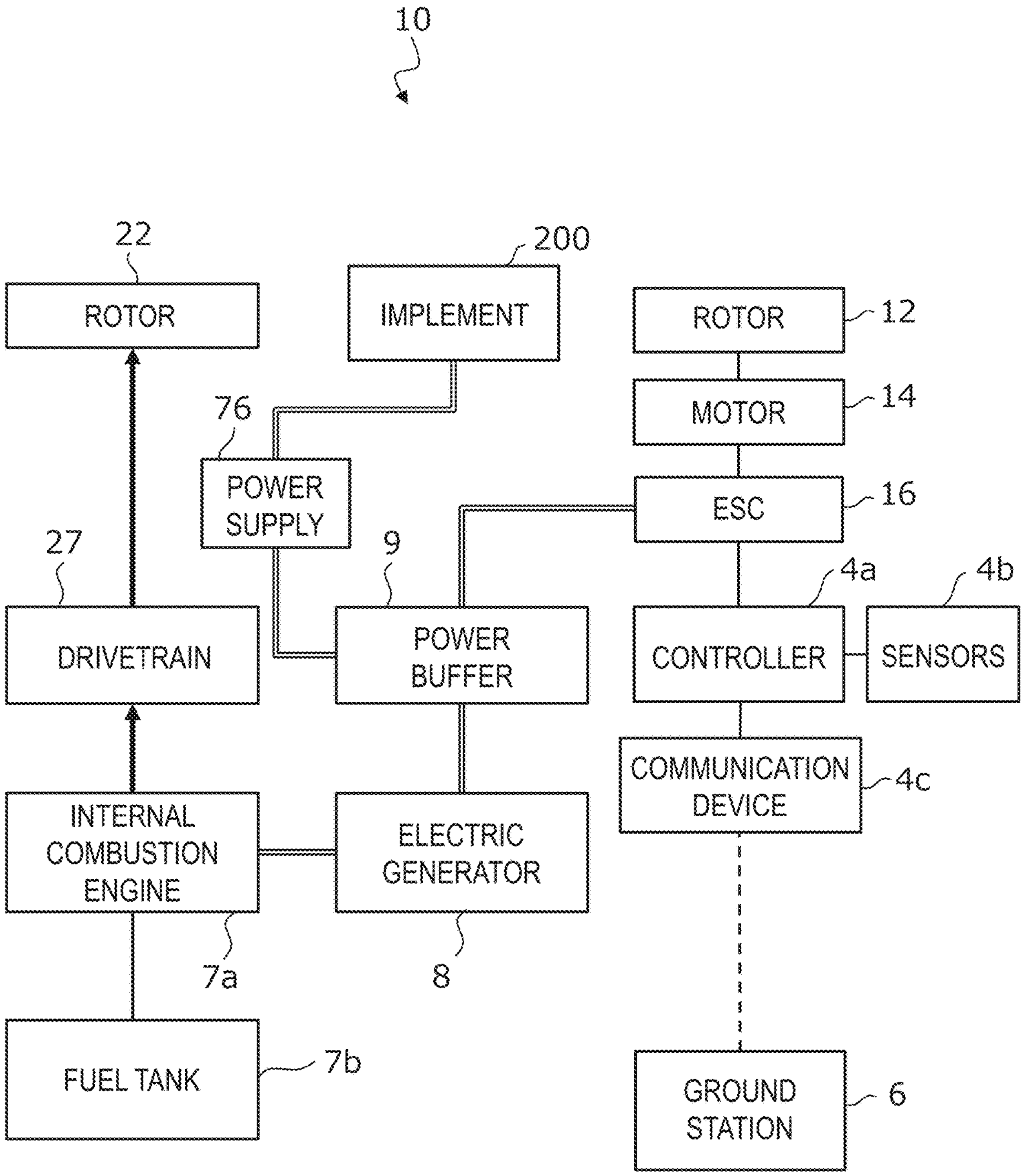
FIG. 2C is a block diagram showing a basic configuration example of a parallel hybrid type multicopter.

FIG. 2C is a block diagram showing a basic configuration example of a parallel hybrid drive type multicopter 10. Like the series hybrid drive type multicopter 10, the parallel hybrid drive type multicopter 10 includes a plurality of rotors 12, a plurality of motors 14, each driving a respective one of the plurality of rotors 12, a plurality of ESCs 16, a controller 4*a*, sensors 4*b*, a communication device 4*c*, an internal combustion engine 7*a*, a fuel tank 7*b*, an electric generator 8, a power buffer 9, and a power supply 76. The parallel hybrid drive type multicopter 10 further includes a drivetrain 27 that transmits a driving force from the internal combustion engine 7*a*, and the rotor 22 that rotates upon receiving the driving force from the internal combustion engine 7*a* through the drivetrain 27. The rotor 12 and rotor 22 may be distinguished by calling one "first rotor" and the other "second rotor". The number of rotors 22 connected to drivetrain 27 and rotated may be one or two or more.

In the parallel hybrid drive type multicopter 10, the internal combustion engine 7*a* not only drives the electric generator 8 to generate power, but also mechanically transmits energy to the rotor 22 to rotate the rotor 22. In contrast, in the series hybrid drive type multicopter 10, all rotors 12 are rotated by electric power generated by the electric generator 8. Therefore, in the series hybrid drive type multicopter 10, when the electric generator 8 is, for example, a fuel cell, the internal combustion engine 7*a* is not an essential component.

The following describes configuration examples and operation examples of an unmanned aircraft according to example embodiments of the present disclosure, taking a parallel hybrid drive multicopter as an example.

Figure 3A:
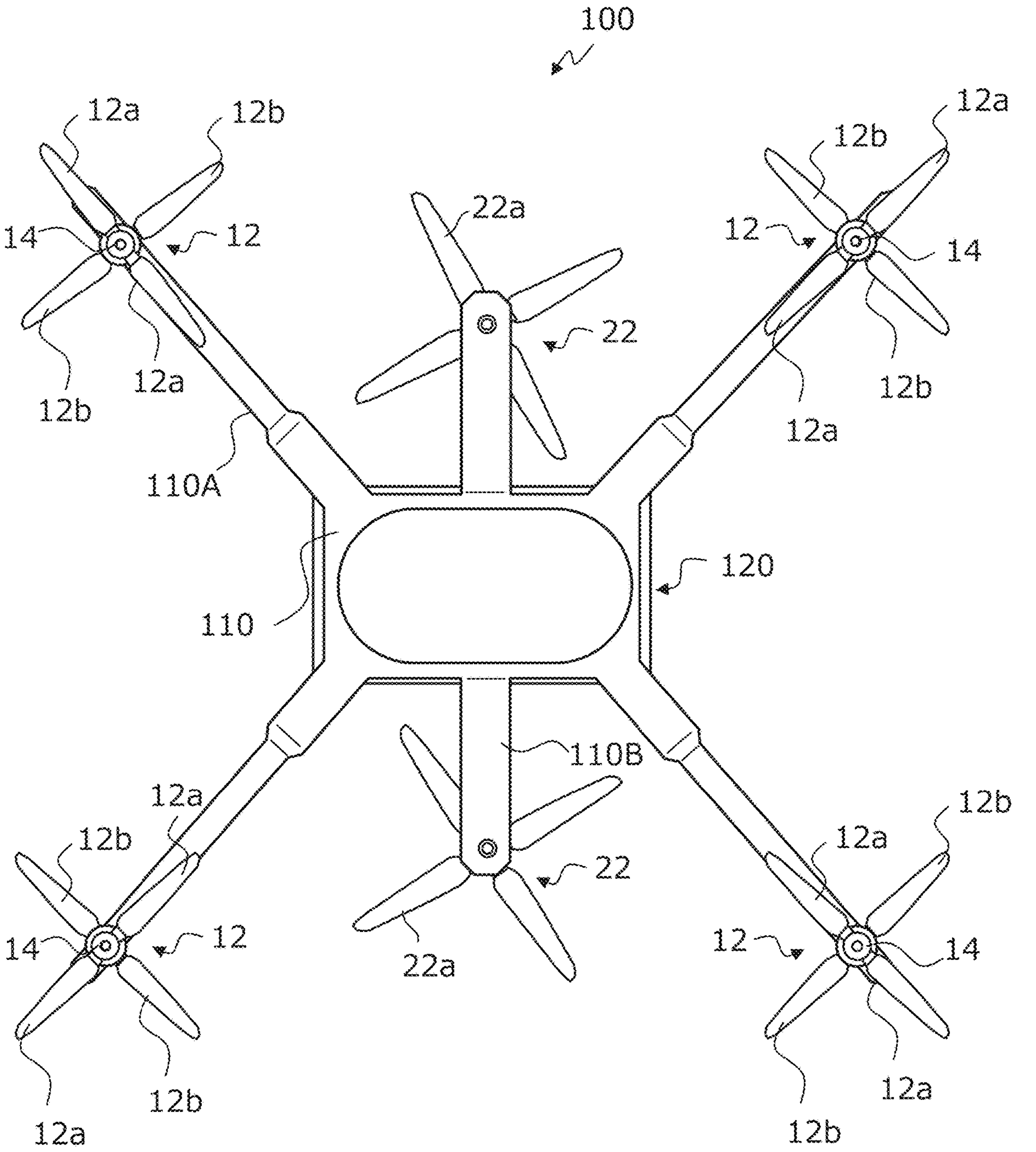
FIG. 3A is a top view schematically showing a multicopter according to an example embodiment of the present invention.
Figure 3B:
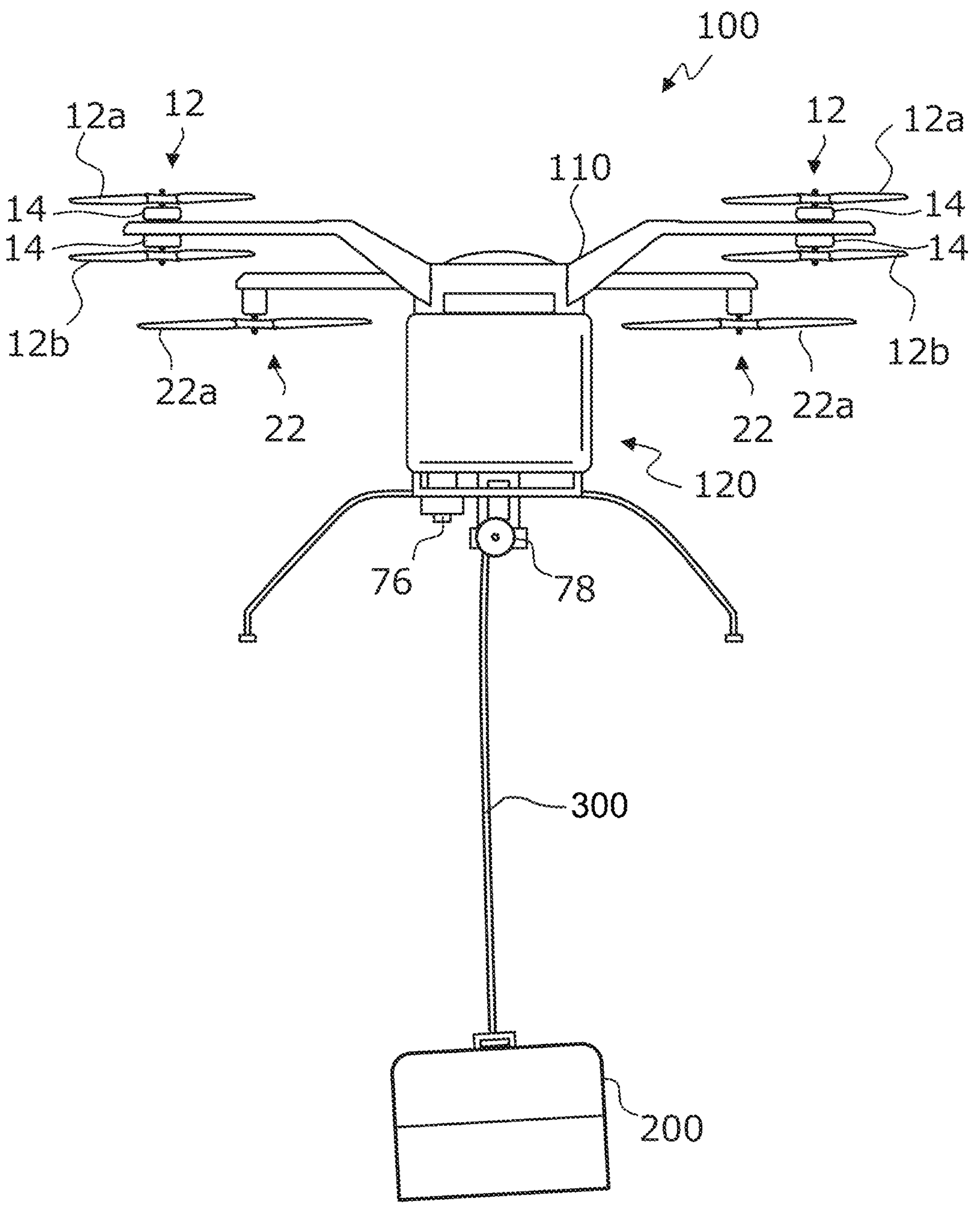
FIG. 3B is a side view schematically showing the multicopter according to the present example embodiment of the present invention.

FIG. 3A is a top view schematically showing a multicopter 100 according to the present example embodiment, and FIG. 3B is a side view thereof. In FIG. 3B, an implement 200 connected to the multicopter 100 is shown. The multicopter 100 may be connected with cargo, agricultural materials, other machinery, or containers, cases, or packages capable of accommodating them, together with or in place of the implement 200. Hereinafter, the weight of the implement 200 and the implement itself may be referred to as "payload". The "connection" between the multicopter 100 and the implement 200 or the like may be made by various instruments or devices.

The multicopter 100 shown in FIG. 3A includes eight sub-rotors 12 and two main rotors 22, for example. The sub-rotors 12 include four sets of propellers 12*a* and 12*b*, for example, that rotate in opposite directions on the same axis. Each of propellers 12*a* and 12*b* includes two blades, for example. The propellers 12*a*, 12*b* are rotated by motor 14. The four sets of propellers 12*a* and 12*b* rotating in opposite directions on the same axis are located at vertices of a quadrilateral. The main rotors 22 include two propellers 22*a* rotating in opposite directions at different positions. Each propeller 22*a* includes four blades, for example. The eight propellers 12*a*, 12*b* of sub-rotor 12 have the same pitch angle and diameter. The two propellers 22*a* of main rotor 22 also have the same pitch angle and diameter. The diameter of propeller 22*a* is, for example, 1.2 times or more, or 1.4 times or more, and 2.0 times or less, than the diameter of propellers 12*a*, 12*b*.

The multicopter 100 includes a body frame 110 including four arms 110A for the sub-rotors 12 and two arms 110B for the main rotors 22, for example. The body frame 110 supports a main body 120 including various electronic components and mechanical components described later.

In the example of FIG. 3B, the main body 120 includes a power supply 76 and an actuator 78 used to connect to the implement 200 and other purposes. The power supply 76 supplies power generated within the main body 120 to the implement 200. The actuator 78 is a device such as an electric motor that performs operations to connect the implement 200 to the main body 120 of the multicopter 100. In the example of FIG. 3B, the actuator 78 drives a mechanism to wind up a cable 300 connecting the main body 120 and the implement 200. This cable 300 may include a power line to supply power (external power) to the implement 200 from the multicopter 100, and a communication line to enable communication between the multicopter 100 and the implement 200.

Figure 4:
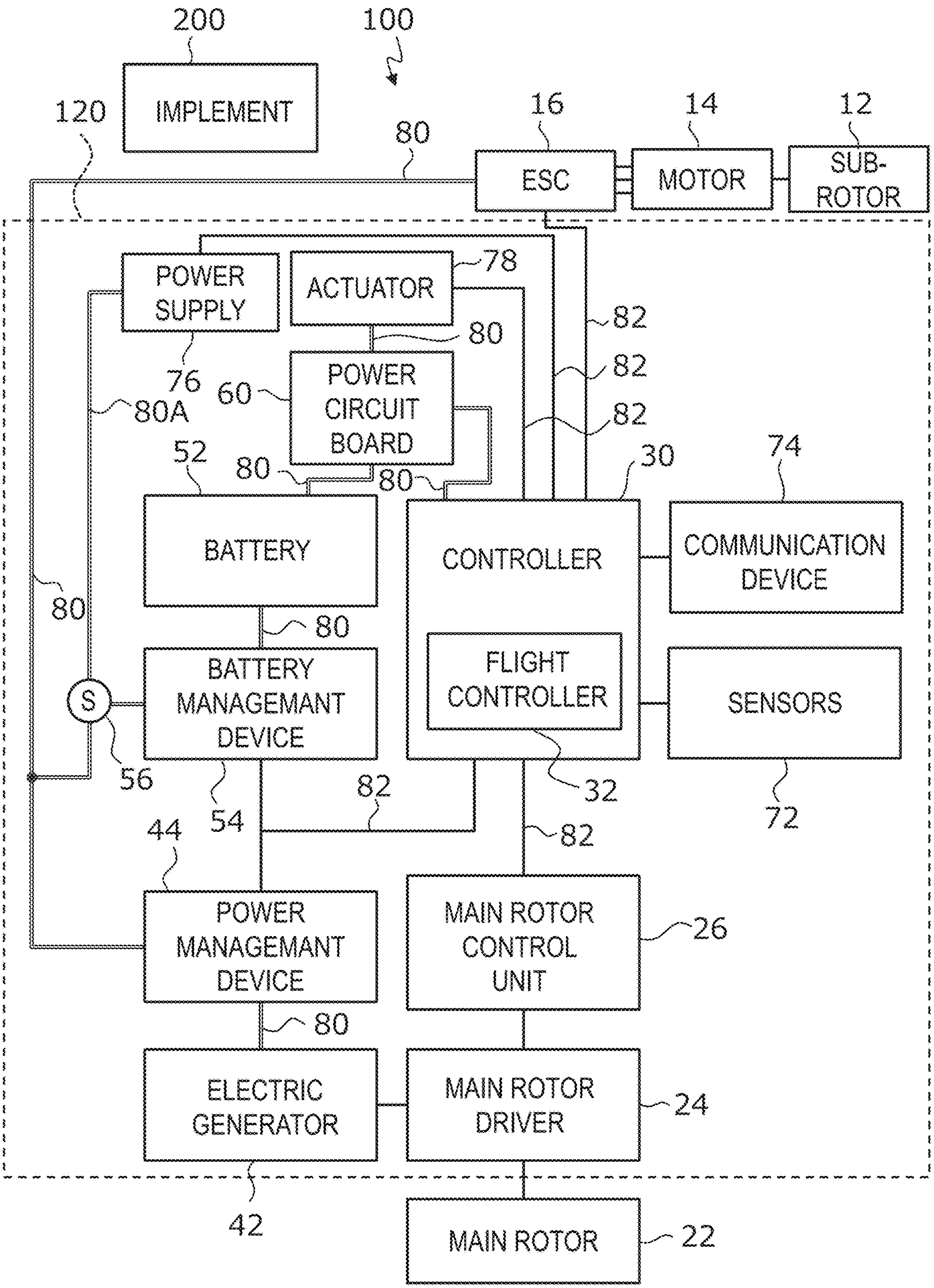
FIG. 4 is a block diagram showing an example of system configuration in the multicopter of the present example embodiment of the present invention.

FIG. 4 is a block diagram showing an example of the system configuration of the multicopter 100 according to the present example embodiment.

In the illustrated example, the main body 120 of the multicopter 100 includes a controller 30 including a flight controller 32, sensors 72, and a communication device 74. This is basically similar to the controller 4*a*, sensors 4*b*, and communication device 4*c* included in the main body 4 of the multicopter 10 explained with reference to FIG. 1A.

The multicopter 100 according to the present example embodiment includes eight sub-rotors 12, eight motors 14 that respectively rotate the eight sub-rotors 12, and eight ESCs that respectively control the eight motors 14, for example. Each ESC 16 receives a motor control signal to control the motor 14 from the controller 30 via wiring 82. The motor control signal is, for example, a PWM (Pulse Width Modulation) signal. When the motor control signal is a PWM signal, the duty cycle of the PWM signal may indicate an analog value of the motor rotation speed. Each ESC 16 controls the rotation speed of the motor 14 connected to that ESC 16 based on the motor control signal from the controller 30. In FIG. 4, for simplicity, one set of "sub-rotor 12, motor 14 and ESC 16" is shown, but the multicopter 100 according to the present example embodiment includes eight sets of "sub-rotor 12, motor 14 and ESC 16", for example. The number of these sets is not limited to eight.

The controller 30 is connected to individual ESCs 16 via electrically independent wiring 82 and may individually control each of the eight ESCs 16. As mentioned earlier, the sub-rotor 12 is used not only to generate lift but also for attitude control. Attitude control is achieved by the flight controller 32 of the controller 30 obtaining measured or estimated values indicating the attitude of the main body 120 from the sensors 72 to determine the current attitude of the main body 120, and controlling the rotation speed of individual motors 14 according to the difference from the target attitude.

The main body 120 includes a main rotor driver 24 that drives the main rotor 22 and a main rotor controller 26 configured or programmed to control the main rotor drive component 24. In this example embodiment, the main rotor drive component 24 is an internal combustion engine. Therefore, the main rotor controller 26 includes an Engine Control Unit (ECU). The main rotor controller 26 is configured or programmed to execute control of the internal combustion engine by acquiring sensor data such as throttle opening, intake temperature, engine speed, and temperature of various portions of the main rotor drive component 24, which is an internal combustion engine. The main rotor controller 26 is connected to the controller 30 via wiring 82 such as a CAN (Controller Area Network) bus. The main rotor controller 26 is configured or programmed to output engine control signals based on signals transmitted from the controller 30. The engine control signal includes, for example, throttle opening. A digital-to-analog converter (DAC) and/or voltage converter may be connected between the controller 30 and the main rotor controller 26. Mechanical devices such as a clutch and reduction gear may be provided between the main rotor driver 24 and the main rotor 22.

The main rotor driver 24 preferably is an internal combustion engine with minimal vibration. In this example embodiment, the main rotor driver 24 is, for example, an opposed piston engine. The opposed piston engine is disclosed in, for example, Japanese Patent No. 5508604. The entire contents of Japanese Patent No. 5508604 are hereby incorporated herein by reference.

The main rotor driver 24, which is an internal combustion engine, may drive an electric generator 42 such as an alternator to generate power. In this example embodiment, the electric generator 42 includes an AC synchronous motor including a rotor and a stator. Therefore, the electric generator 42 may also function as a "starter" by rotating the rotor through energization during startup of the main rotor driver 24. The electric generator 42 rectifies the alternating current generated by power generation to convert it to direct current. The electric generator 42 generates direct current power required to drive the motor 14 and supplies it to each ESC 16 via wiring 80. The electric generator 42 is configured to output, for example, a direct current voltage of 250V or higher. Note that the wiring 80 is power wiring, and the wiring 82 is signal wiring. Each of wirings 80 and 82 includes a plurality of conductors.

The electric generator 42 is connected to a power management device 44. The power management device 44 is connected to the controller 30 and a battery management device 54 to be described later. The power management device 44 may control the amount of power generation by the electric generator 42 based on signals from the controller 30 or the battery management device 54. This amount of power generation may be variably controlled by the power management device 44 according to the power required by the motor 14 and battery 52, even when the engine speed of the main rotor driver 24, which is an internal combustion engine, is in a constant state.

The main body 120 further includes a battery 52 including a plurality of cells of, for example, lithium-ion secondary batteries connected in series or parallel, and a battery management device 54 that controls charging and discharging of the battery 52.

The battery 52 may receive direct current power from the electric generator 42 via a power switch 56 and be charged by that power. The operation of the power switch 56 may be controlled by the battery management device 54 and the controller 30. The battery management device 54 measures or estimates parameter values defining the state of battery 52, such as current flowing through battery 52, cell voltage, cell balance, State Of Charge (SOC), State Of Health (SOH), and temperature.

The battery management device 54 may control the power switch 56 according to the state of the battery 52. For example, when the battery 52 is in a state requiring charging, the battery management device 54 electrically connects the electric generator 42 and battery 52 by means of the power switch 56, and supplies power from the electric generator 42 to the battery 52 to execute charging operation. At this time, the battery management device 54 may control the power management device 44 and increase the amount of power generation by the electric generator 42 so that the power supplied to ESC 16 does not fall below a desired level. In contrast, when the battery 52 is in a state not requiring charging, the battery management device 54 disconnects the electrical connection between the electric generator 42 and battery 52 by the power switch 56, thereby stopping the charging of the battery 52.

In this example embodiment, the battery 52 has a power storage capacity that allows, even when power generation by the electric generator 42 stops for some reason and lift from the main rotor 22 is lost, continued generation of lift and attitude control by the sub-rotor 12 to fly to a location where landing is possible and land there. In other words, when the multicopter 100 according to this example embodiment is flying normally, the power required to drive the sub-rotor 12 can be supplied to ESC 16 from the electric generator 42 rather than from the battery 52. Therefore, even when increasing payload and flight duration, there is little need to increase the power storage capacity of battery 52 accordingly.

The power stored in battery 52 may be output as, for example, a direct current voltage of 250V or higher. However, this direct current voltage decreases with decreasing state of charge. Therefore, when the state of charge falls below a predetermined level, the battery management device 54 operates to supply part of the direct current power from the electric generator 42 to battery 52 to charge battery 52.

The battery 52 is connected to a power circuit board 60. The power circuit board 60 has the function of stepping down the voltage output from battery 52 to, for example, 24V, 12V, and 5V. The direct current voltage output from battery 52 is converted to a desired voltage by the power circuit board 60 before being supplied to other electronic components. In the example of FIG. 4, power stepped down by the power circuit board 60 is supplied to the controller 30 and actuator 78 via wiring 80.

In the example shown in FIG. 4, while the power management device 44 and battery management device 54 are separate components, a single controller (computer or ECU) may function as both the power management device 44 and battery management device 54.

In the example of FIG. 4, the power supply 76 is electrically connected to the electric generator 42 or battery 52 via the power switch 56. The power supply 76 in this example is configured to supply power (external power) generated within the main body 120 to external machines and devices such as the implement 200.

The main body 120 may have configurations not shown in FIG. 4. For example, the main body 120 may include a fuel tank for storing fuel required for operation of the main rotor driver 24, water-cooled or air-cooled devices for cooling the main rotor driver 24, and electrical equipment such as lighting devices and electric pumps. The electrical equipment may operate on power stepped down to a predetermined voltage by the power circuit board 60. Additionally, a battery (auxiliary battery) for electrical equipment may be provided and configured to supply power to the electrical equipment. Such an auxiliary battery may be charged from the battery 52 or the electric generator 42.

In this example embodiment, the motor 14 functions as a plurality of "attitude controllers" that respectively drive a plurality of first rotors (sub-rotors) 12. Additionally, the main rotor driver 24, which is an internal combustion engine, functions as a "main thrust generating device" that drives the second rotor (main rotor) 22.

In this example embodiment, the controller 30 may vary the ratio (power ratio) between the first drive power output from a plurality of motors 14 and the second drive power output from the main rotor driver 24. This point will be explained in detail below.

Generally, the responsiveness of motor 14 is superior to that of internal combustion engines. Regarding the torque required for rotation of rotors 12, 22, when the time from the input of a torque command signal to the achievement of the torque target value is called the "response time," the response time of motors is, for example, about 1/100 of that of internal combustion engines. Therefore, to control the attitude of the multicopter 100, it is desirable to detect the difference between the current value and target value of the attitude angle of the multicopter 100, and control the rotation speed of each of the plurality of sub-rotors 12 with high response speed to reduce this difference. An increase in rotor rotation speed generates an increase in thrust. By adjusting the thrust of each of the plurality of sub-rotors 12, it is possible to control the attitude of the multicopter 100 with high precision and quickly.

In contrast, internal combustion engines efficiently generate large thrust. While the rotation of sub-rotor 12 is performed using power generated by the power of the main rotor driver 24, which is an internal combustion engine, energy loss occurs when converting mechanical energy to electrical energy. Therefore, from the viewpoint of improving energy consumption efficiency, it is preferable that the main rotor driver 24 be used for main thrust generation by rotating the main rotor 22. Additionally, to increase the thrust of main rotor 22, it is preferable that the diameter of main rotor 22 be larger than the diameter of each of the plurality of first rotors 12.

However, when the main rotor 22 for main thrust generation is generating large thrust, that large thrust and rotational moment may, conversely, inhibit the attitude control function of the sub-rotors 12. As a result, even when using the plurality of motors 14 with superior responsiveness to rotate the plurality of sub-rotors 12, delays in attitude control response may occur. In contrast, while lowering the rotation speed of the main rotor 22 improves attitude control performance, energy consumption efficiency decreases.

In battery-powered multicopters, various algorithms are used to adjust the torque of each of the plurality of motors to balance the thrust of each rotor and control to a desired attitude. When performing attitude control with the plurality of motors in such case, adding a rotor rotated by an internal combustion engine may complicate the calculations needed for attitude control. To avoid such complications, it is effective to fix the "ratio" between the drive power output from the plurality of motors and the drive power output from the internal combustion engine. Therefore, in conventional parallel hybrid types, a control method that fixes this ratio has been adopted.

However, as a result of studies by the present inventors, it was discovered that when using the multicopter 100 for agricultural work, for example, it is preferable to make the above "ratio" variable rather than fixed, compared to when flying the multicopter 100 for simple logistics or surveillance purposes. This is because when flying for agricultural purposes, the multicopter 100 operates under various different conditions, such as various agricultural work (ground work) within fields, movement between a plurality of fields, and transport of agricultural materials or harvested crops, and due to these conditions, the required response speed level for attitude control changes significantly. Additionally, when connecting implements with diverse weights and shapes selected according to the content of agricultural work, the required lift and precision of attitude control may also change significantly.

In this example embodiment, each of the plurality of motors 14 may operate by receiving at least one of power (first power) from the battery 52 and power (second power) from the electric generator 42. The battery 52 and the electric generator 42 function as "power sources". Each of the plurality of motors 14 is connected to wiring 80 that supplies power from the power sources (the electric generator 42 and the battery 52). Power may also be supplied from the power sources to devices other than the motors 14. The wiring (second wiring) 80A branching from the wiring (first wiring) 80 electrically connects the power source and the power supply 76, enabling power supply from the power source to the implement 200.

In this example embodiment, the battery management device 54 functions as a first power controller configured or programmed to control charging and discharging of the battery 52, and the power management device 44 functions as a second power controller configured or programmed to control power generation by the electric generator 42. And the first power controller, namely the battery management device 54, is configured or programmed to control the second power controller, namely the power management device 44.

The multicopter 100 according to this example embodiment, by including a battery management device 54 and power management device 44, enables at least one of the following control operations:

(1) The first power controller, namely the battery management device 54, controls the second power controller, namely the power management device 44, according to the state of battery 52.

(2) The first power controller, namely the battery management device 54, controls the power management device 44 to adjust the amount of power generation according to the work content of multicopter 100.

(3) The first power controller, namely the battery management device 54, controls the state of charge of battery 52 according to flight conditions including the flight altitude of multicopter 100.

(4) The first power controller, namely the battery management device 54, controls the state of charge of battery 52 according to the distance from multicopter 100 to a possible landing point.

Below, examples of the above control operations by the battery management device 54 will be explained.

Figure 5:
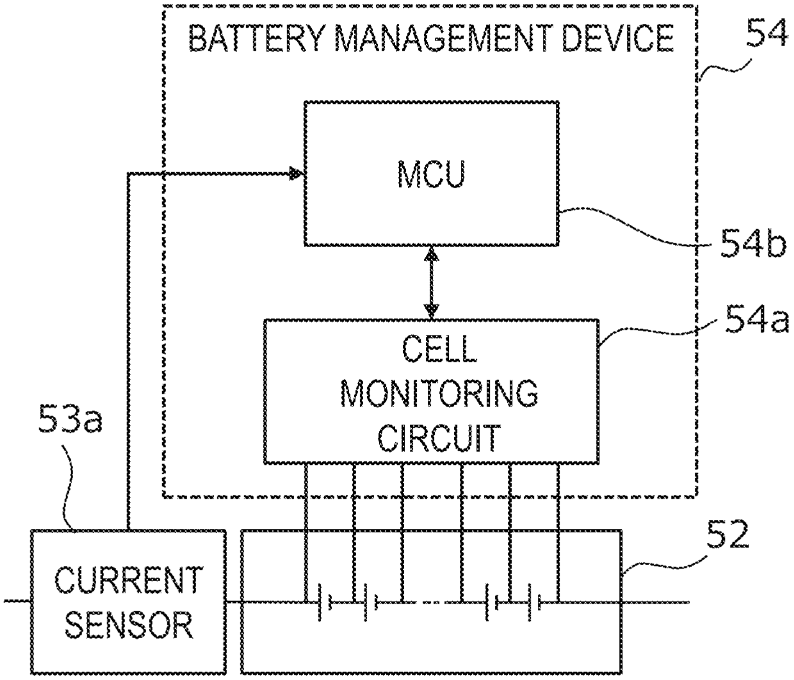
FIG. 5 is a block diagram showing a configuration example of a battery management device in the present example embodiment of the present invention.

First, referring to FIG. 5, an example configuration of the battery management device 54 will be explained. FIG. 5 is a block diagram showing an example configuration of the battery management device 54. In the illustrated example, the battery management device 54 includes a cell monitoring circuit 54*a* that monitors the state (voltage and temperature, and other parameters) of each of a plurality of single cells (cells) included in the battery 52, and a microcontroller (Microcontroller Unit: MCU) 54*b* that estimates the state of the battery 52 and executes battery management operations.

The cell monitoring circuit 54*a* may be configured to measure the voltage of each cell and execute cell balancing during charging. The cell monitoring circuit 54*a* may include a protection circuit that prevents overcharging and over-discharging of each cell. Such protection circuits may be provided in battery packs that each include a plurality of cells.

The MCU 54*b* may obtain current measurement values from a current sensor 53*a* that measures current flowing through the battery 52. It may also obtain various sensor data such as temperature measurements of battery 52 from other sensors. The battery management device 54 may be programmed to execute various calculations to estimate, for example, the state of charge (SOC) of the battery 52. The state of charge (SOC) is one of the state variables that define the state (charging state) of the battery 52. The parameters defining the state of the battery 52 are not limited to state of charge and may include variables such as charge amount (remaining charge), cell voltage, battery temperature, State Of Health (SOH), and Full Charge Capacity (FCC).

As shown in FIG. 4, the battery management device 54, functioning as the first power controller, may control the electrical connection state between wiring 80 connecting the electric generator 42 to the motor 14 and the battery 52.

The battery management device 54 may control the second power controller, namely the power management device 44, according to the state of battery 52.

For example, when the state of charge (SOC) of battery 52 is equal to or higher than a first reference value (for example, 60%), the battery management device 54 controls the power management device 44 to supply power from the electric generator 42 to motor 14 without charging battery 52 from the electric generator 42. In contrast, for example, when the state of charge (SOC) of battery 52 falls below the first reference value, the battery management device 54 controls the power management device 44 to charge the battery 52 from the electric generator 42. This charging may be continued until the state of charge (SOC) of battery 52 reaches a second reference value (for example, 90%).

The above operation is just one example. For example, the first reference value may be 80% and the second reference value may be 90%. The first reference value and second reference value need not be fixed values.

The battery management device 54 may control the power management device 44 to adjust the amount of power generation according to the work content of multicopter 100. The work content of multicopter 100 is defined by a work plan. Then, an implement 200 selected according to the content of the work may be connected to the multicopter 100. Details of the work plan will be described below.

The work plan includes information about one or more agricultural works to be executed by the multicopter 100. When work is performed by a plurality of multicopters 100, different work plans may be generated for each multicopter 100. The work plan includes information about one or more agricultural works to be executed by each multicopter 100, and information about the fields where each agricultural work is performed. The work plan may include information about a plurality of agricultural works to be executed by each multicopter 100 over a plurality of work days, and information about the fields where each agricultural work is performed. More specifically, the work plan may be a database including schedule information indicating, for each day, at what time, which multicopter will perform which agricultural work, in which field. Therefore, for example, when a work plan is provided to the controller 30 of the multicopter 100, the controller 30 can obtain information about how the power consumption of multicopter 100 and implement 200 will change as the work starts and progresses. In this example embodiment, according to the work content defined by the work plan, in other words, in response to changes in power consumption, the battery management device 54 may control the power management device 44. Specifically, when there is not enough power remaining in battery 52 at a sufficient level to supply the necessary power consumption to perform the work, the battery management device 54 is configured to control the power management device 44 to increase the amount of power generation to raise the state of charge of battery 52.

Below, an example of a work plan defining the work content of multicopter 100 (and implement 200) will be explained in detail. In this example embodiment, the work plan may be generated by a management system (agricultural management system) for multicopter 100.

Figure 6:
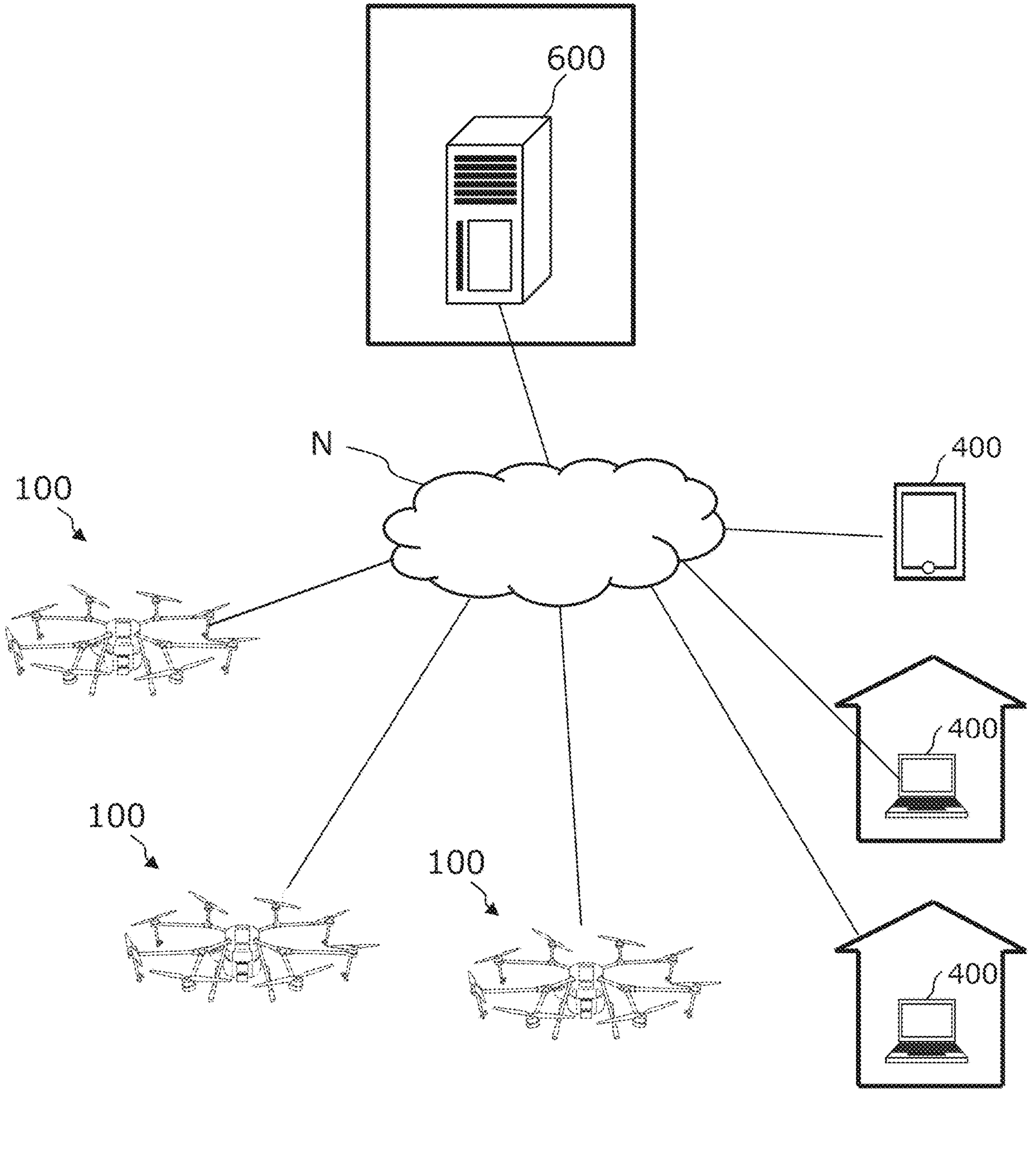
FIG. 6 is a diagram for explaining an overview of an agricultural management system in the present example embodiment of the present invention.

FIG. 6 is a diagram explaining an example of an agricultural management system that may be utilized in this example embodiment. The agricultural management system shown in FIG. 6 includes a plurality of multicopters 100 and a management device 600. FIG. 6 also shows a plurality of terminal devices 400 used by a plurality of users. The management device 600 is a computer managed by an operator running the agricultural management system. The multicopter 100, terminal device 400, and management device 600 are configured to communicate with each other via a communication network N. While FIG. 6 illustrates three multicopters 100 as examples, the agricultural management system may include two or fewer, or four or more multicopters 100. The agricultural management system may include not only multicopter 100 but also various types of agricultural machines such as tractors, rice transplanters, combines, and the like. Each multicopter 100 may execute assigned agricultural work in designated fields according to instructions from the management device 600. Note that operation of multicopter 100 may be primarily conducted by users (operators) from the ground, in which case the management device 600 may be used to generate work plans by users or other people.

The agricultural management system shown in FIG. 6 may be suitably utilized to manage agricultural work using a plurality of multicopters 100 that fly automatically or manually. The management device 600 may generate work plans for each multicopter 100 based on information indicating outline plans for agricultural work input by each user using their respective terminal devices 400, and plan routes for each multicopter 100 based on those work plans. The management device 600 may include a collection of a plurality of computers. For example, the management device 600 may include a computer that generates work plans for each multicopter 100 and a computer that plans routes for each multicopter 100.

The management device 600 determines routes that each multicopter 100 should move along to execute specified agricultural work (for example, tilling, seeding, planting, pest control, fertilizing, harvesting, and other work contents). The management device 600 generates routes on maps that each multicopter 100 should move along by referring to maps of the areas where each multicopter 100 moves, and transmits that route information to each multicopter 100 or user's terminal device 400. The multicopters 100 capable of automatic flight move based on the received route information and execute specified agricultural work in their assigned fields. In the case of manually flown multicopters 100, users can operate multicopter 100 based on route information received at terminal device 400.

In this example embodiment, since the multicopter 100 may install or tow an implement 200, the multicopter 100 can fly over fields while performing agricultural work according to the type of implement 200. The multicopter 100 also moves between fields, or fly between storage facilities and fields.

In an example embodiment, the multicopter 100 has an automatic flight capability. That is, the multicopter 100 can fly without manual operation, through the operation of the controller 30. In an example embodiment, the multicopter 100 can fly automatically or by remote control not only above fields but also above areas outside the fields.

In the present example embodiment, the controller 30 of the multicopter 100 may automatically fly the multicopter 100 based on the position of the multicopter 100 and information about the target path generated by the management device 600. The controller 30 may control not only the flight control of the multicopter 100 but also the operation of the implement 200. This enables the multicopter 100 to automatically fly within the field while performing agricultural work using the implement 200. During flight, the multicopter 100 generates local paths that avoid obstacles along the target path based on sensor data output from sensors 72 such as imaging devices or LiDAR sensors.

The management device 600 may include a server computer that, for example, centrally manages information about fields and agricultural work in the cloud and supports agriculture by utilizing cloud data. The management device 600, for example, generates work plans for each multicopter 100 and performs global path planning for each multicopter 100 according to that work plan.

The management device 600 generates target paths in fields based on information about the fields. For example, the management device 600 may generate target paths within fields based on various information such as pre-registered field shapes, field areas, field entrance/exit locations, size of the multicopter 100, model or size of the implement 200, work content, crop type, crop growth area, crop growth status, or spacing between crop rows or ridges. The management device 600 may generate target paths within fields based on information input by users using terminal devices 400 or other devices. The management device 600 generates paths within fields to cover, for example, the entire work area where work is to be performed.

The terminal device 400 may be a computer used by users who are located away from the multicopter 100. The terminal device 400 may be a mobile terminal such as a laptop computer, smartphone, or tablet computer as shown in FIG. 6, or may be a stationary computer such as a desktop PC (personal computer). The terminal device 400 displays a settings screen on its display for users to input information necessary for generating work plans (for example, schedules for each agricultural work). When the user inputs the necessary information on the settings screen and performs a transmission operation, the terminal device 400 transmits the input information to the management device 600. The management device 600 generates work plans based on this information. The terminal device 400 may also be used to register one or more fields where the multicopter 100 will perform agricultural work.

FIG. 7 shows an example of work plans for each multicopter 100. In this example, the work plan includes information indicating, for each registered multicopter 100, the dates and times when agricultural work will be performed, the fields, work content, and the implements 200 to be used. The work plan is not limited to the format shown in FIG. 7 and may include other information related to the work. For example, information such as types or application amounts of agricultural chemicals or fertilizers may be included in the work plan. According to such work plans, the processor of the management device 600 generates paths for each multicopter 100 on each work day and issues instructions for agricultural work to each multicopter 100. The work plan may be downloaded by the controller 30 of the multicopter 100 and stored in the storage device 37 described later. In that case, the controller 30 may autonomously initiate operations according to the schedule shown in the work plan stored in the storage device 37.

The management device 600 may generate work plans based not only on information indicating approximate timing of agricultural work, but also on information input by each user using the terminal device 400. For example, the management device 600 may generate work plans based on information indicating rough plans for each type of agricultural work in one or more fields managed by each user.

Figure 8:
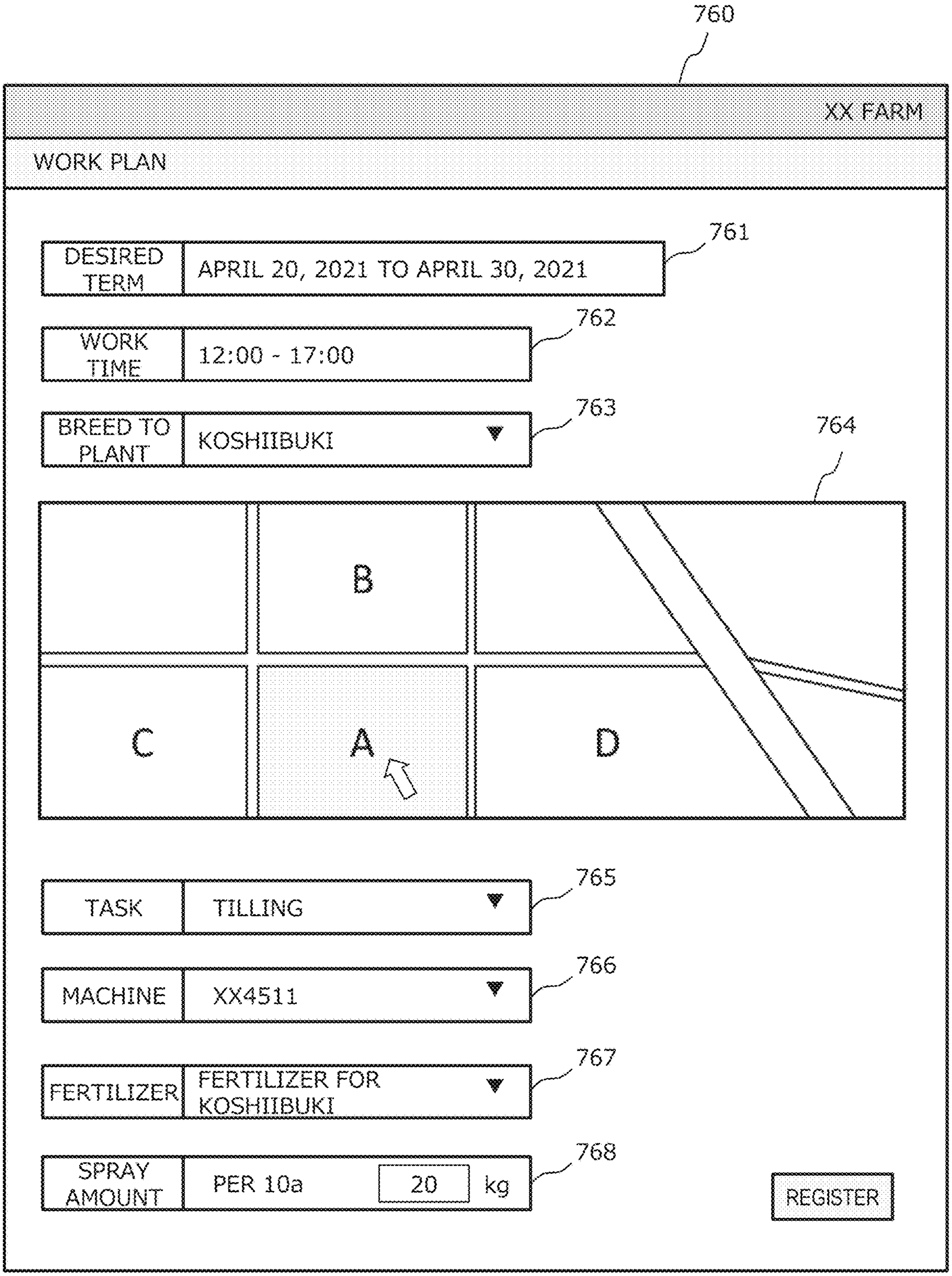
FIG. 8 is a diagram showing an example of a settings screen displayed on a terminal device.

FIG. 8 shows an example of a settings screen 760 displayed on the display screen of the terminal device 400. The processor of the terminal device 400 launches application software to generate work plans in response to user operation using an input device, and causes the display screen to display a settings screen 760 as shown in FIG. 8. Users can input rough plan information necessary to generate work plans on this settings screen 760.

FIG. 8 shows an example of the settings screen 760 for when tilling with fertilizer application is performed in a field for rice cultivation. The settings screen 760 is not limited to what is shown and may be modified as appropriate. The settings screen 760 in the example of FIG. 8 includes a period setting section 761, time setting section 762, planting variety selection section 763, field selection section 764, work selection section 765, machine selection section 766, fertilizer selection section 767, and application amount setting section 768.

The period setting section 761 displays the period input by the user. The user inputs the desired period in which to execute the agricultural work. Days included in the input period are set as candidate dates for agricultural work.

The time setting section 762 displays the work hours input by the user. The user inputs the desired work hours in which to execute the agricultural work. The work hours are specified by start time and end time. The input work hours are set as candidates for when the agricultural work will be performed.

The planting variety selection section 763 displays a list of crop varieties to be planted (that is, to be set in the ground). Users may select desired varieties from the list. In the example of FIG. 8, the rice variety "Koshiibuki" is selected.

The field selection section 764 displays fields on a map. Users may select any field from the displayed fields. In the example of FIG. 8, the portion indicating "Field A" is selected. In this case, the selected "Field A" is set as the field where agricultural work will be performed. Users may also select a plurality of fields simultaneously.

The work selection section 765 displays a plurality of agricultural works necessary to cultivate the selected crop. Users may select one agricultural work from among the plurality of agricultural works. In the example of FIG. 8, "tilling" is selected from among the plurality of agricultural works. In this case, the selected "tilling" is set as the agricultural work to be executed.

The machine selection section 766 is usable to select the multicopter to be used in that agricultural work. The machine selection section 766 may display, for example, types or models of multicopters previously registered by the management device 600, and types or models of implements 200 that can be used. Users may select specific machines from among the displayed machines. In the example of FIG. 8, an implement 200 with model number "XX4511" is selected. In this case, this particular implement 200 is set as the machine to be used in the agricultural work.

The fertilizer selection section 767 displays names of a plurality of pre-registered fertilizers. Users may select specific fertilizers from among the plurality of fertilizers displayed. The selected fertilizer is set as the fertilizer to be used in the agricultural work.

The application amount setting section 770 displays numerical values input from the input device 420. The input numerical value is set as the application amount.

On the settings screen 760, when the intended period, work hours, planting variety, field, work, fertilizer, and application amount are input and "Register" is selected, the communication device of the terminal device 400 transmits the input information to the management device 600. The processor of the management device 600 stores the received information in the storage device.

It should be noted that the information on agricultural work managed by the management device 600 is not limited to what has been described above. For example, the settings screen 760 may be configured to allow setting of types and application amounts of agricultural chemicals to be used in the field. Information regarding agricultural works other than those shown in FIG. 8 may also be made settable.

The management device 600 generates work plans for agricultural work to be executed by each multicopter 100 based on information received from each user's terminal device 400 and other sources. For example, the management device 600 determines the actual work dates and work hours for agricultural work to be executed by each multicopter 100. For example, the management device 600 determines the dates and times for executing agricultural work in each field by comprehensively considering the number, distribution, and usage status of multicopters 100, the distribution of fields where agricultural work is performed in that region, the work dates and times desired by each user, and the approximate timing guidelines for work in that region. Algorithms utilizing artificial intelligence (AI) such as deep neural networks may be used to determine the dates and times for executing agricultural work in each field. The management device 600 notifies the terminal devices 400 used by users of the determined dates and times for executing agricultural work. When the determined dates and times for execution differ from those desired by users, information in that regard may be notified. The management device 600 executes path planning for each multicopter 100 for each work day based on the determined dates and times for executing agricultural work in each field.

With such a work plan generated by the management system described above, the battery management device 54 of the present example embodiment can efficiently control the power management device 44 to increase and decrease the amount of power generation. Specifically, as described later, the amount of power generation can be increased in synchronization with the operation of the implement 200.

Additionally, with a work plan, the battery management device 54 of the present example embodiment can efficiently control the power management device 44 to increase and decrease the amount of power generation while monitoring the state (particularly the state of charge) of the battery 52. Specifically, as described later, the amount of power generation can be increased immediately before the implement 200 starts operation. Since batteries 52 such as lithium-ion batteries tend to deteriorate when kept in a fully charged state, the process of increasing the state of charge in conjunction with the start of work by the implement 200 is also effective for extending the life of the battery 52. Such a control of state of charge is explained below.

For example, when the state of charge (SOC) of the battery 52 is at or above a first reference value (for example, 60%), the battery management device 54 controls the power management device 44 to supply power from the electric generator 42 to the motors 14 without charging the battery 52. In contrast, when the state of charge (SOC) of the battery 52 falls below the first reference value, for example, the battery management device 54 executes charging of the battery 52 from the electric generator 42. This charging may be configured to continue until the state of charge (SOC) of the battery 52 reaches a second reference value (for example, 90%).

The above operation is just one example. For instance, the first reference value may be 80% and the second reference value may be 90%. The first reference value and second reference value need not be fixed.

The battery management device 54 is configured to control the state of charge of the battery 52 according to flight conditions including the flight altitude of the multicopter 100. Flight conditions are various parameters that determine the power consumption per unit time (power consumption) consumed by the multicopter 100 during flight, such as flight altitude, flight speed, wind direction and wind speed during flight, and payload size (weight). In the present example embodiment, the controller 30 calculates an estimated value of power consumption based on the parameters that define the flight conditions described above. In the present example embodiment, the battery management device 54 is configured to determine whether it is possible to descend and land at a possible landing point using only the power currently stored in the battery 52, based on the estimated power consumption obtained from the controller 30. When it determines that it is not possible to descend and land at the possible landing point using only the power currently stored in the battery 52, the battery management device 54 initiates charging operations to increase the state of charge of the battery 52. This means increasing the first reference value as described above. Such modification of the first reference value may be executed according to the content of work performed by the multicopter 100, as power consumption varies depending on the work content. Details of the work content of the multicopter 100 will be described later.

The range with the first reference value as the lower limit and the second reference value as the upper limit is the "target range" for state of charge control performed by the battery management device 54. This target range is preferably varied according to flight status or work status as described above. For example, when the battery 52 is used as an emergency backup power source in case the electric generator 42 fails, the power stored in the battery 52 (first power) only needs to be large enough to enable descent and landing on the ground without using power (second power) generated by the electric generator 42. In such case, the power stored in the battery 52 (first power) may be smaller when the flight altitude is lower. Therefore, for example, the lower limit (first reference value) of the target range for the state of charge (SOC) may be varied according to the flight altitude.

Figure 9:
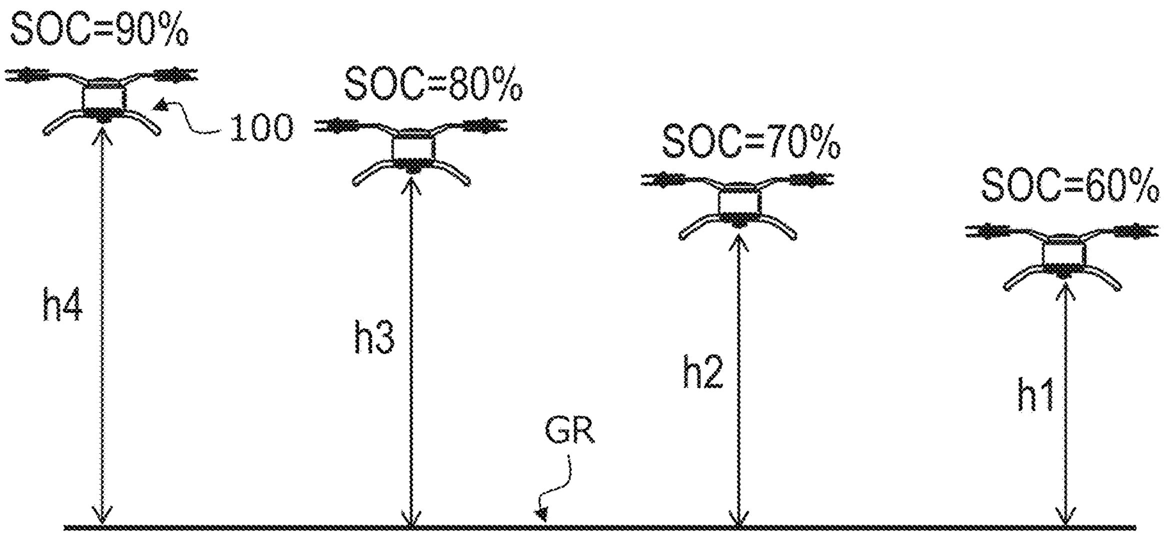
FIG. 9 is a side view schematically showing lower limits (first reference values) of target ranges for state of charge (SOC) when the flight altitude of the multicopter in the present example embodiment is h4, h3, h2, and h1.
Figure 10:
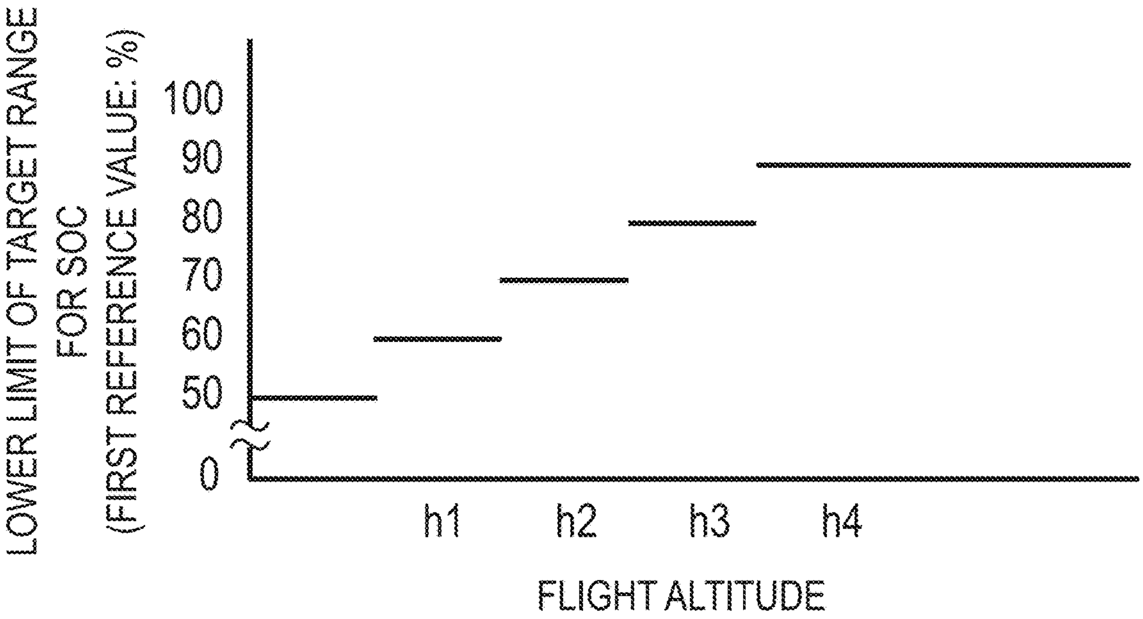
FIG. 10 is a graph schematically showing an example of the relationship between flight altitude of the multicopter and the lower limit (first reference value) of the target range for state of charge (SOC) in the present example embodiment of the present invention.

FIG. 9 is a side view schematically showing the lower limit (first reference value) of the target range for the state of charge (SOC) when the height (flight altitude) of the multicopter 100 from the ground GR is h4, h3, h2, h1 (where h4>h3>h2>h1>0). FIG. 10 is a graph schematically showing an example of the relationship between the height from the ground GR of the multicopter 100 and the lower limit (first reference value) of the target range for the state of charge (SOC).

As shown in FIGS. 9 and 10, in this example, the first reference value for the state of charge (SOC) can be decreased as the flight altitude of the multicopter 100 decreases. When the state of charge (SOC) of the battery 52 falls below the first reference value, the battery management device 54 controls the power management device 44 to increase the amount of power generation and executes charging of the battery 52.

In the example of FIG. 10, the first reference value changes stepwise according to the flight altitude, but it may change linearly or curvilinearly. Additionally, in the example of FIG. 10, the first reference value for the state of charge (SOC) is 50% or higher, for example, but when the multicopter 100 is flying or performing ground work at low altitude, for example 5 meters or less, the first reference value may be set to, for example, 50% or lower.

The first reference value may be changed between when performing ground work within a target field and when flying to move in areas outside that field.

The battery management device 54 may control the state of charge of the battery 52 according to the distance from the multicopter 100 to possible landing points.

As described above, the technical significance of controlling the state of charge according to flight altitude utilizes the fact that the power consumption required for the multicopter 100 to descend and land from that flight altitude depends on the flight altitude. However, there may be cases where the multicopter 100 is flying over a position where landing is not possible even when it descends directly downward. In such cases, it is preferable for the multicopter 100 to control the state of charge of the battery 52 based on power consumption that considers the distance to a possible landing point.

In an example embodiment, the controller 30 measures or estimates the position (self-position) of the multicopter 100 during flight based on sensor data obtained from the sensors. Then, it may calculate the distance to possible landing locations based on map information and determine the first reference value according to that distance. Such distance calculation is not limited to being performed by the controller 30, but may be executed by a higher-level computer, a computer at the ground station 6, or one or more computers connected to the communication network described later. The battery management device 54 of the multicopter 100 may then perform charging processes to achieve the state of charge necessary to fly the distance to the landing point through communication between those computers and the multicopter 100.

Thus, the preferred target range for parameters such as the state of charge (SOC) or charge amount of the battery 52 may vary not only according to the flight altitude or position of the multicopter 100 but also according to various conditions such as work content. Furthermore, the work content of the multicopter 100 also depends on the type of implement 200 connected to or towed by the multicopter 100 (such as model name, model number, power consumption, or size). In the present example embodiment, target ranges for parameters defining the state of the battery 52 is selected according to various flight conditions or work content, and the battery management device 54 may control charging and discharging.

As mentioned earlier, when charging the battery 52, the battery management device 54 of the present example embodiment may control the amount of power generation by controlling the power management device 44.

Figure 11:
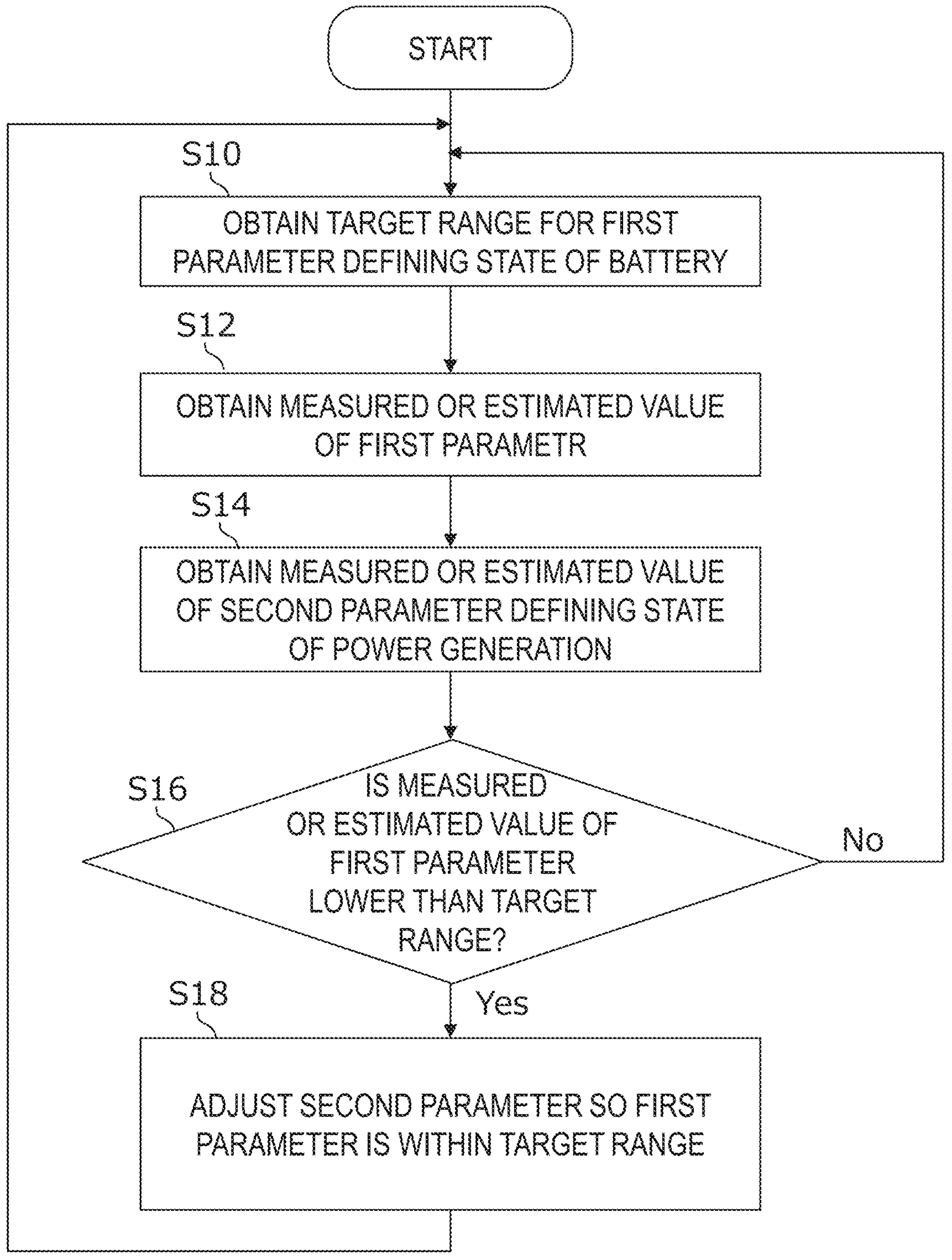
FIG. 11 is a flowchart showing an example of processing performed by the battery management device in the present example embodiment of the present invention.

Next, an example of the control of the power management device 44 by the battery management device 54 will be explained with reference to FIG. 11.

In step S10, the battery management device 54 obtains a target range for parameters (first parameters) that define the state of the battery 52, such as the state of charge (SOC). The target range may be specified by a first reference value defining the lower limit and a second reference value defining the upper limit. The target range may be provided to the battery management device 54 from the controller 30. The controller 30 may estimate the required power based on known flight plans or work plans and determine the target range, or it may obtain the target range from a higher-level computer or ground station 6.

In step S12, the battery management device 54 obtains measured or estimated values of the first parameters defining the current state of the battery 52.

In step S14, the battery management device 54 obtains a measured or estimated value of parameter (second parameter) defining the current power generation state. The measured or estimated value of the second parameter may be provided to the battery management device 54 from the power management device 44 or the controller 30. An example of the second parameter includes power generated per unit time, main rotor drive unit rotation speed (engine speed), and main rotor drive unit output.

In step S16, the battery management device 54 determines whether the measured or estimated value of the first parameter is below the target range. When No, return to step S10. When Yes, in step S18, the battery management device 54 adjusts the second parameter so that the measured or estimated value of the first parameter is within the target range. For example, the battery management device 54 provides an instruction signal to the power management device 44 to increase the amount of power generation. The increase in power generation may be performed in predetermined amount units. Alternatively, the battery management device 54 may instruct the power management device 44 on the amount of increase in power generation.

After the processing in step S18, return to step S10. In step S10, the target range for the first parameter is obtained, but this target range may change dynamically according to the flight status or the work status as described earlier.

The above flow is just one example, and the control of the power management device 44 by the battery management device 54 may be executed by other algorithms.

The multicopter 100 of the present example embodiment includes, as mentioned earlier, a power supply 76 that supplies external power from the battery 52 and electric generator 42 to the implement 200. For implements 200 used in agricultural applications, appropriate implements may be selected and attached from various types of interchangeable implements according to the planned ground work. Therefore, the drive power (energy consumption per unit time) of the implement 200 strongly depends on the type of implement 200 connected to the multicopter 100, in other words, the content of ground work performed by the implement 200 connected to the multicopter 100. Therefore, in the present example embodiment, the "controller" is configured or programmed to control the drive power from the power source (the battery 52 and the electric generator 42) according to the current operation state or planned operation state of the implement 200 connected to the multicopter 100. This point will be explained in more detail below.

In one example embodiment, the controller 30 included in the multicopter 100 is configured or programmed to control at least one of: the operation of the internal combustion engine serving as the main rotor driver 24 shown in FIG. 4, the operation of the motors 14, the charging and discharging of the battery 52, and power generation by the electric generator 42, according to the content of current operation or planned operation of the implement 200.

For example, the controller 30 may start charging the battery 52 before the start of operation of the implement 200 according to the content of the planned operation of the implement 200. Such information indicating the planned operations may be obtained from the work plan described earlier. Additionally, the controller 30 may adjust the state of charge or charge amount of the battery 52 according to the content of operation of the implement 200. Since such operation content of the implement 200 is defined by the work content (work schedule) in the work plan described earlier, the controller 30 may estimate the time variation of power consumption of the implement 200 based on that work schedule. In contrast, the content of current operation of the implement 200 during work is defined by the above work plan or instructions received by the controller 30 from the user. Therefore, the controller 30 may increase or decrease the amount of power provided from the power supply 76 to the implement 200 in accordance with increases and decreases in power consumption of the implement 200, based on the content of current operation or the planned operation of the implement 200.

The power required by the implement 200 includes the power consumed when the implement 200 performs ground work and the power consumption of electrical equipment such as an actuator included in the implement 200. Additionally, when the implement 200 includes a battery, this includes the power needed to charge that battery.

Thus, the power supplied from the power supply 76 of the multicopter 100 to the implement 200 depends on the content of operation (operation state) of the implement 200. In contrast, the power that the multicopter 100 is capable of supplying from the power supply 76 to the implement 200 is determined by the power consumption of the motors 14 included in the multicopter 100, the charging and discharging amount of the battery 52, and the amount of power generation by the electric generator 42. The amount of power generation by the electric generator 42 may be adjusted by the operation of the main rotor driver 24. In the present example embodiment, since the controller 30 is configured or programmed to control at least one of the operation of the main rotor driver 24, the operation of the motors 14, the charging and discharging of the battery 52, and power generation by the electric generator 42, it enables appropriate supply of the amount of power required by the implement 200 from the power supply 76 to the implement 200.

The "controller" mentioned here is not limited to the controller 30 shown in FIG. 4, but may include an upper-level computer, a computer on the ground station, and/or a computer in the cloud. Below, for simplicity, we will explain an example where the controller 30 shown in FIG. 4 controls not only the power source state but also the operation of the main rotor driver 24 and the motor 14. The controller 30 may supply at least a portion of the power from the battery 52 (first power) and power from the electric generator 42 (second power) as third power from the power supply 46 to the implement 200 using the battery management device 54 and power management device 44.

The controller 30 may initiate charging of the battery 52 or increase the amount of power generation by the electric generator 42 before the start of operation according to the planned operation content of the implement 200.

Figure 12:
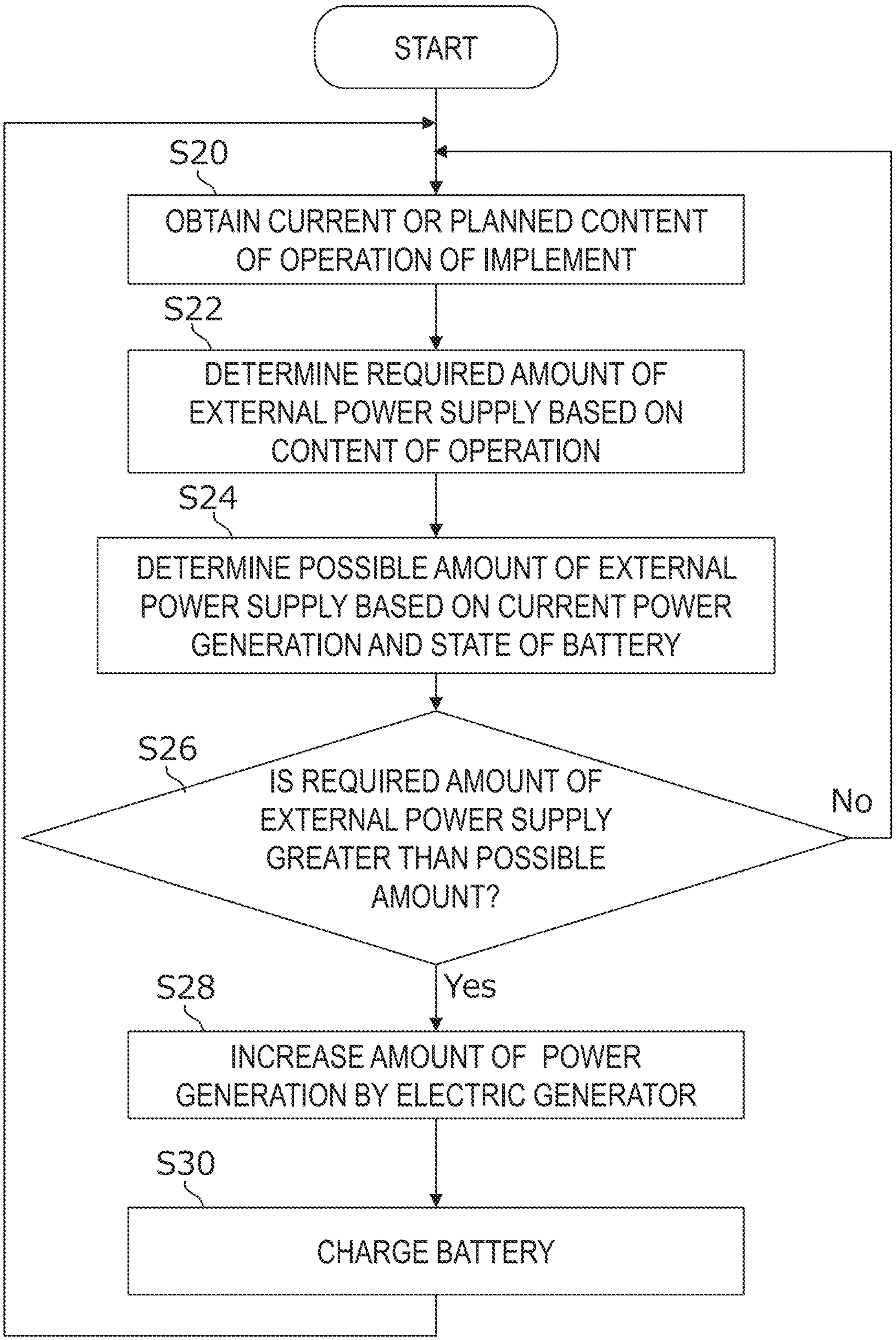
FIG. 12 is a flowchart showing an example of external power supply operation in the present example embodiment of the present invention.
Figure 13:
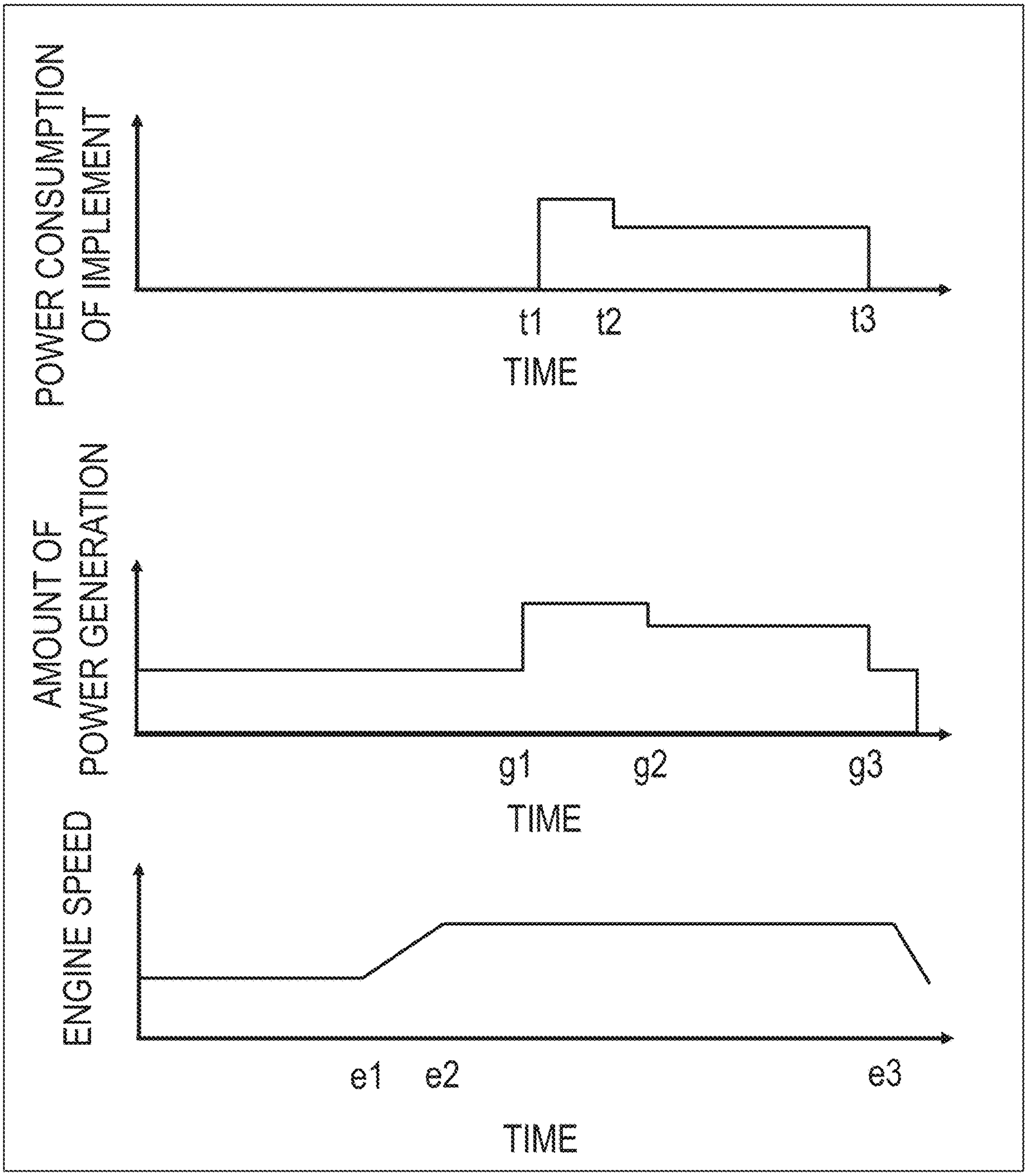
FIG. 13 is a graph showing an example of relationships among power consumption of the planned operation of the implement, an amount of power generation, and engine speed in the present example embodiment of the present invention.

Next, an example of external power supply operation will be explained with reference to FIGS. 12 and 13. FIG. 12 is a flowchart showing an example of external power supply operation in the present example embodiment. FIG. 13 is a graph showing an example of the relationship between power consumed by planned operations of the implement 200, the amount of power generation by the electric generator 42, and engine speed in the present example embodiment. Here, "engine speed" corresponds to the number of rotations per unit time (rotational speed) of the output shaft of the internal combustion engine functioning as the main rotor driver 24.

First, in step S20, the controller 30 obtains the content of current or planned operations of the implement 200. The content of operation of the implement 200 may be obtained from the implement 200 or may be obtained from the work plan stored in the storage device included in the controller 30. The content of operation of the implement 200 includes the start time of the operation of the implement 200. Additionally, the content of operation of the implement 200 may include at least one of: type of operation, operation end time, operation duration, power required for operation (power consumption per unit time), and cumulative power amount required until the end of operation. The "power consumption of the implement" shown in FIG. 13 schematically shows power consumption in an example where the implement 200 starts operation at time t1. In this example, between time t1 and time t2, the power consumption temporarily indicates a relatively high value, but after time t2, it remains at a relatively low value and the operation of the implement 200 stops at time t3. The variation of power consumption shown in FIG. 13 is just an example and may vary in various manners depending on the type of implement 200 and the content of work performed by the implement 200. Additionally, the operation of the implement 200 may be performed intermittently and repeatedly.

In step S22, the controller 30 determines the required amount of external power supply based on the content of operation of the implement 200. When the operation content of the implement 200 obtained in step S20 includes only the operation start time, for example, the controller 30 may determine the required amount of external power supply based on a power consumption table for each implement stored in the storage device. When the content of operation of the implement 200 obtained in step S20 includes information about the power required for operation, that power may be determined as the required amount of external power supply.

In step S24, the controller 30 obtains information about the current power generation state (for example, amount of power generation) and battery state (for example, charge amount) from the power management device 44 and the battery management device 54, and determines the possible amount of external power supply. Even when the current power generation amount is small, if the charge amount of the battery 52 is sufficiently high, the possible amount of external power supply may be high.

In step S26, the controller 30 determines whether the required amount of external power supply is greater than the possible amount. When No, return to step S20. When Yes, in step S28, the controller 30 increases the amount of power generation by the electric generator 42. In the example of FIG. 13, the controller 30 increases the amount of power generation by the electric generator 42 at time g1, which is earlier than time t1. The controller 30 may vary the amount of power generation increase by the electric generator 42 according to changes in the required amount of external power supply. In the example of FIG. 13, the amount of power generation increase is reduced at time g2 after time t2, and the power generation is returned to the pre-increase level at time g3 after time t3.

When increasing the power generation amount, the controller 30 may first increase the engine speed of the main rotor driver 24, which is an internal combustion engine. The increase in engine speed may not always have a high response speed. In such case, it is preferable to start increasing the engine speed at time e1, which is earlier than time t1 when the implement 200 starts operation, by the length of the response time. As a result, it is possible to reach the engine speed to generate the required amount of power generation at time e2, which is earlier than time t1. In the example of FIG. 13, the engine speed gradually increases between time e1 and time e2, then maintains a constant level, and decreases to the pre-increase level from time e3. In this example, the engine speed does not change in response to relatively short-term fluctuations in power consumption of the implement 200. It is preferable to have fewer changes in engine speed.

Next, proceeding to step S30, the controller 30 charges the battery 52 with power 28 generated by the electric generator 42. The charge amount may be determined based on the required amount of external power supply.

In the above example, the required amount of external power supply (supply power) is determined based on the content of operation of the implement 200, but the algorithm described below may be adopted without performing such processing.

Before the implement 200 starts operation, start charging the battery 52 from the electric generator 42 and increase the state of charge of the battery 52 to a desired level (for example, 90% or higher). In this case, it is preferable that the timing for starting the charging of the battery 52 is such that the charging rate reaches the desired level by the planned time for starting the operation of the implement 200.

When the planned time for starting the operation of the implement 200 is, for example, immediately after the multicopter 100 starts flying, and when the state of charge of the battery 52 immediately after the multicopter 100 starts up is lower than the desired level, the controller 30 may start charging the battery 52 promptly after startup (for example, before flight begins) and increase the state of charge.

Before the implement 200 starts operation, increase the power generation amount by the electric generator 42 by a predetermined amount and supply the increased power to the implement 200. It is preferable that the amount of power generation increase is set to a level equal to or higher than the power required for the operation of the implement 200. In this case, the operation of the implement 200 does not require power consumption from the battery 52. When power generation by the electric generator 42 is performed using the driving force of an internal combustion engine with a longer response time than an electric motor, the controller 30 may be configured or programmed to start increasing the driving force of the main rotor driver 24, for example, 1 second, preferably 2 or 3 seconds before the implement 200 starts operation. When a portion of the increased power generation amount is not needed for the operation of the implement 200, it may be used for charging the battery 52.

In flight conditions where it is possible to reduce the thrust of the main rotor 22 (for example, when descending), the power transmitted from the main rotor driver 24 to the main rotor 22 may be reduced, and the ratio of power used to drive the electric generator 42 from the output of the main rotor driver 24 may be increased. By using mechanical devices (such as a clutch) provided between the main rotor 22 and the main rotor driver 24, the driving force generated by the main rotor driver 24 can be efficiently used to increase the amount of power generation by the electric generator 42.

Figure 14:
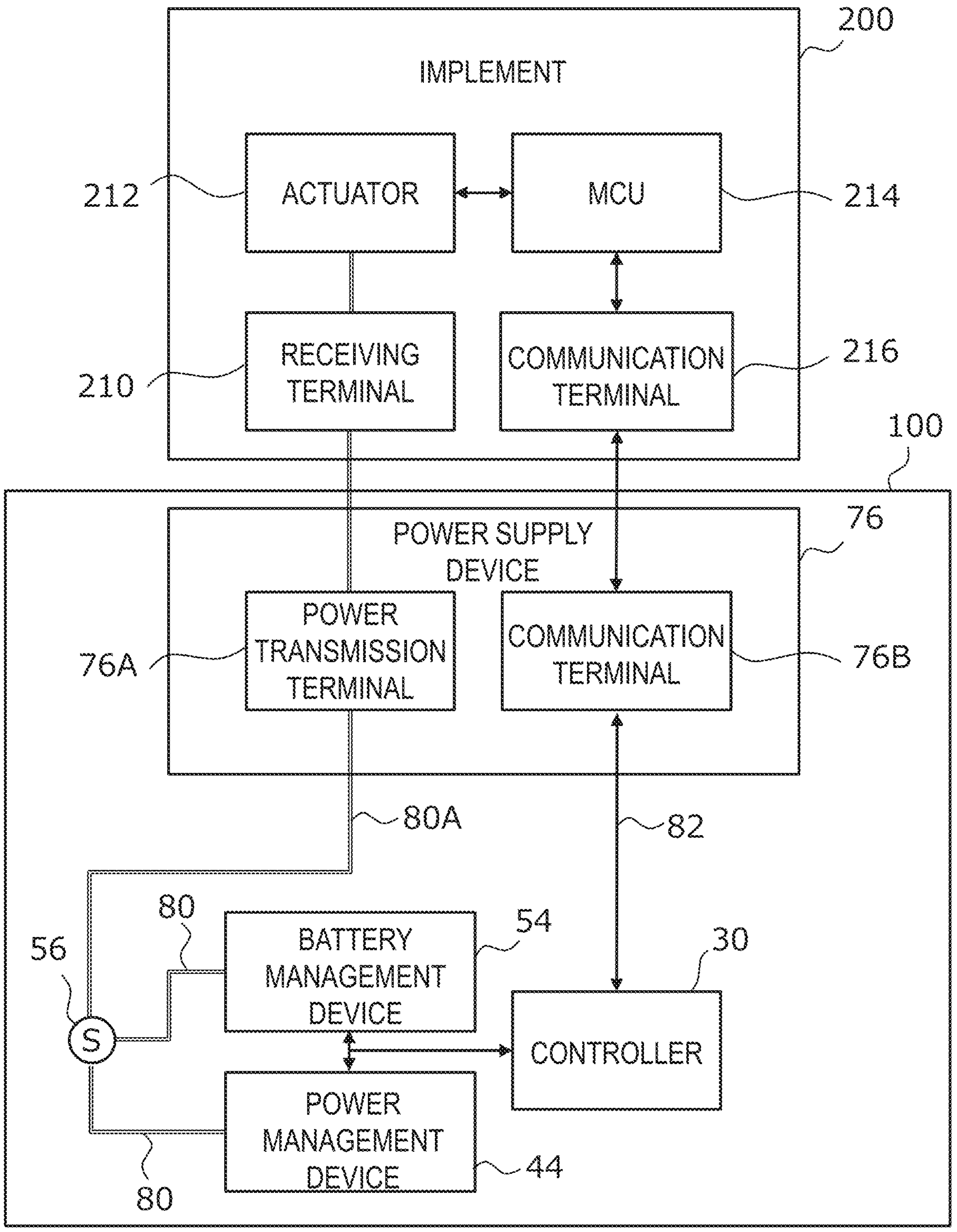
FIG. 14 is a block diagram schematically showing the connection state between the power supply and the implement in the present example embodiment of the present invention.

FIG. 14 is a block diagram schematically showing the connection state between the power supply 76 and the implement 200 in the present example embodiment.

In the example of FIG. 14, the implement 200 includes a power receiving terminal 210 that is electrically connected to the power supply 76, an actuator 212 to perform ground work (agricultural work), an MCU 214 that controls the actuator 212, and a communication terminal 216 to communicate with the multicopter 100. In contrast, the power supply 76 includes a power transmission terminal 76A that is electrically connected to the power receiving terminal 210 of the implement 200 to supply power, and a communication terminal 76B to communicate with the implement 200.

Examples of the actuator 212 include one or more electric motors. The actuator 212 may be configured to drive a pump to spray agricultural chemicals or fertilizers, or to operate a robot hand. The implement 200 may include electrical equipment, secondary batteries, sensors, and mechanical parts not shown in FIG. 14. The secondary battery of the implement 200 may store a portion or all of the power received from the power receiving terminal 210 and supply that power not only to the actuator 212 but also to the MCU 214 and other electrical equipment.

Examples of electrical connection between the power receiving terminal 210 and the power transmission terminal 76A include direct contact enabling conduction, connection via conductive cables or wiring, and connection via wireless power transmission. Examples of electrical connection between communication terminals 216 and 76B also include direct contact enabling conduction, connection via communication cables or wiring, and connection via wireless communication.

The power receiving terminal 210 and communication terminal 216 may be configured such that the same terminal performs both power reception and communication. Similarly, the power transmission terminal 76A and communication terminal 76B may be configured such that the same terminal performs both power transmission and communication.

The controller 30 of the multicopter 100 may obtain information about the power required for the operation of the implement 200 from the MCU 214 of the implement 200 via communication terminals 216 and 76B. Such information may include information about the operation plan of the implement 200.

The controller 30 may generate and supply power required for the operation of the implement 200 based on the information obtained from the implement 200. Note that the implement 200 does not need to include the MCU 214, and the controller 30 of the multicopter 100 may be configured or programmed to execute some or all of the functions of the MCU 214 of the implement 200.

Figure 15:
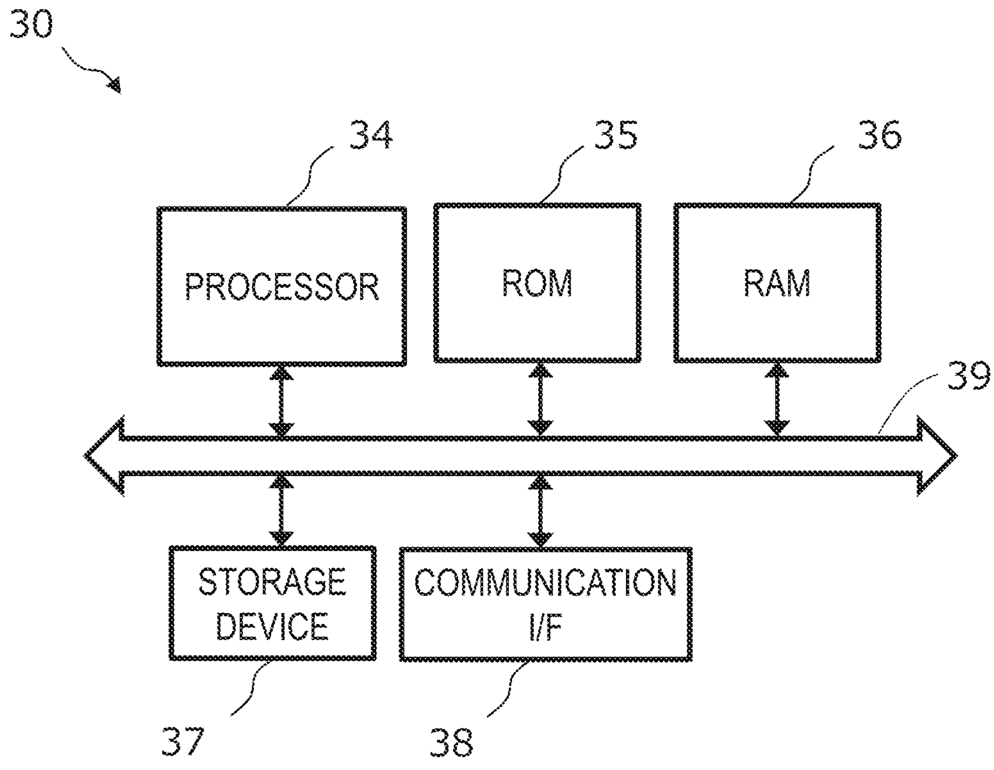
FIG. 15 is a block diagram showing an example of hardware configuration of the controller in the present example embodiment of the present invention.

FIG. 15 is a block diagram showing an example of the hardware configuration of the controller 30. The controller 30 includes a processor 34, ROM (Read Only Memory) 35, RAM (Random Access Memory) 36, storage device 37, and communication I/F 38. These components are interconnected via a bus 39.

The processor 34 may include one or more semiconductor integrated circuits, also referred to as a central processing unit (CPU) or microprocessor. The processor 34 sequentially executes computer programs stored in ROM 35 to implement the aforementioned processing. The term processor 34 is broadly interpreted to encompass devices such as FPGA (Field Programmable Gate Array) with CPU, GPU (Graphic Processor Unit), ASIC (Application Specific Integrated Circuit), or ASSP (Application Specific Standard Product).

The ROM 35 is, for example, a writable memory (for example, PROM), rewritable memory (for example, flash memory), or read-only memory. The ROM 35 stores programs that control the operation of the processor. The ROM 35 need not be a single recording medium but may be a collection of a plurality of recording media. Part of the plurality of collections may be removable memory.

The RAM 36 provides a work area to temporarily expand programs stored in the ROM 35 during boot-up. The RAM 36 need not be a single recording medium but may be a collection of a plurality of recording media.

The communication I/F 38 is an interface for communication between the controller 30 and other electronic components or electronic control units (ECUs). For example, the communication I/F 38 may perform wired communication complying with various protocols. The communication I/F 38 may perform wireless communication complying with Bluetooth® standards and/or Wi-Fi@ standards. Both standards include wireless communication standards utilizing the 2.4 GHz frequency band.

The storage device 37 may be, for example, a semiconductor memory, magnetic storage device, or optical storage device, or a combination thereof. The storage device 37 is configured to store, for example, map data useful for autonomous flight of the multicopter 10, and various sensor data acquired by the multicopter 10 during flight.

Note that, as mentioned earlier, the controller 30 may include, as separate components, a flight controller such as the flight controller 32 and an upper-level computer (companion computer). The companion computer may execute each of the aforementioned processes and provide flight-related commands to the flight controller based on the results of those processes.

Figure 16:
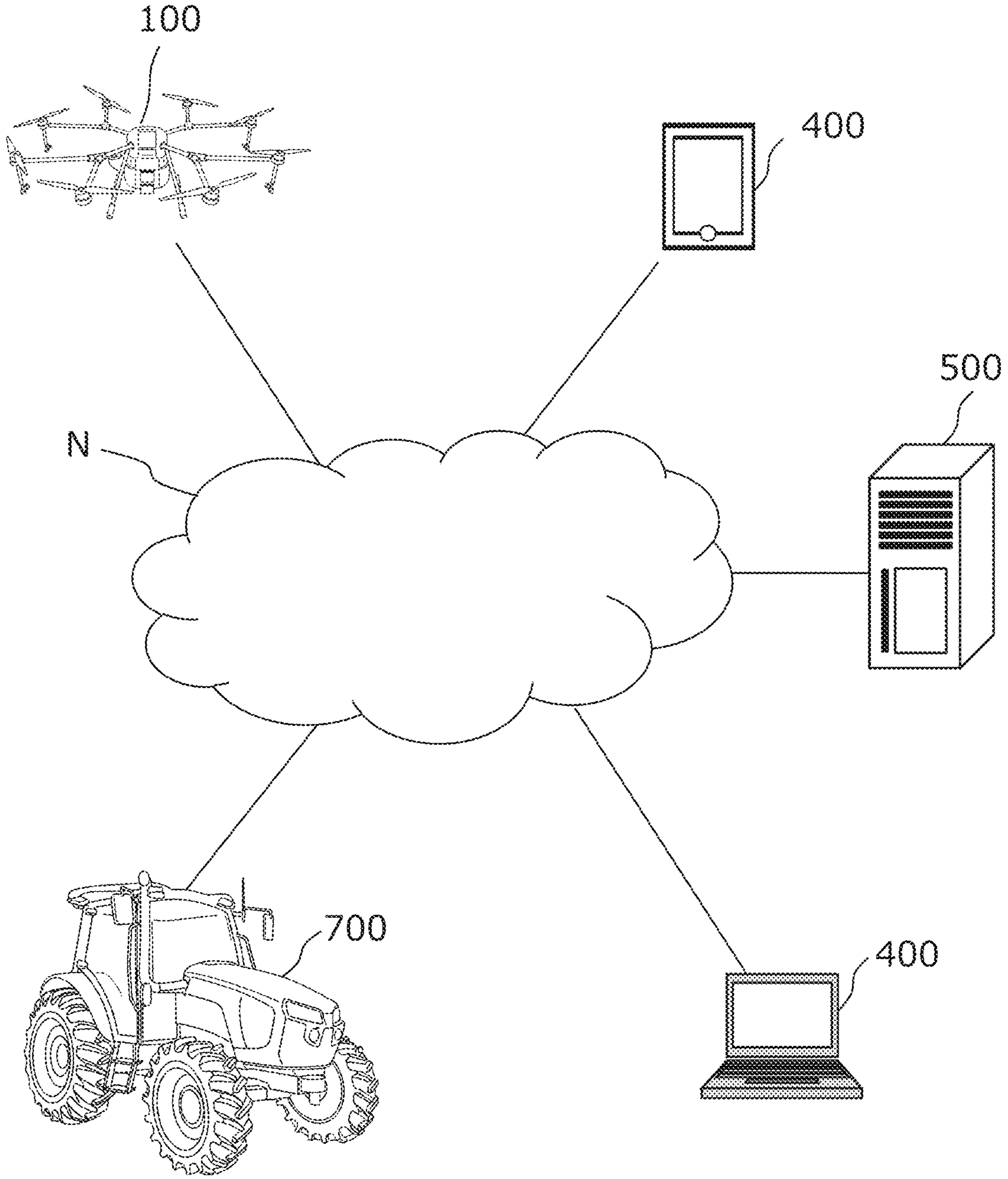
FIG. 16 is a diagram schematically showing an example of a communication network to which the multicopter in the present example embodiment is connected.

Additionally, one or more servers (computers) 500 or terminal devices (including portable and fixed types) 400 connected to the communication device of the multicopter 100 via a communication network N, as shown in FIG. 16, may execute some or all of the functions of the controller 30. The agricultural machine 700 such as tractors may be connected to this communication network N, and communication may be performed between the multicopter 100 and the agricultural machine 700. Through the communication network N, a portion of the data used for processing by the controller 30 and control signals for the multicopter 100 may be provided to the multicopter 100 from the agricultural machine 700.

In the unmanned aerial vehicle according to the above example embodiment, the "attitude controller" includes a plurality of electric motors, and the "main thrust generating device" includes an internal combustion engine. In other words, the unmanned aerial vehicle according to the above example embodiment includes the rotation driver 3D shown in FIG. 1A. However, even with the rotation drivers 3A, 3B, and 3C shown in FIG. 1A, an unmanned aerial vehicle including both an "attitude controller" and a "main thrust generating device" can be realized by making some motors 14 or power transmission systems 23 different from other motors 14 or power transmission systems 23.

Additionally, the unmanned aerial vehicle may be includes a plurality of internal combustion engines having different outputs and response speeds. In such a case, the internal combustion engine with relatively low output and relatively high response speed may be the "attitude controller," while the internal combustion engine with relatively high output and relatively low response speed may be the "main thrust generating device".

Unmanned aerial vehicles according to example embodiments of the present disclosure may be widely utilized not only for aerial photography, surveying, logistics, and agricultural chemical spraying applications but also for ground work related to agriculture, transportation of harvested crops and agricultural materials.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An unmanned aerial vehicle comprising:
- a plurality of rotors;
- a power source;
- a power supply to supply external power from the power source to an implement;
- a plurality of electric motors each to drive a respective one of a plurality of first rotors included in the plurality of rotors;
- a first wiring to supply power from the power source to each of the plurality of electric motors; and
- a second wiring that branches from the first wiring to supply the external power from the power source to the power supply.

2. The unmanned aerial vehicle according to claim 1, wherein the power source includes a battery to store a first electric power.

3. The unmanned aerial vehicle according to claim 1, further comprising:
- at least one second rotor included in the plurality of rotors;
- an internal combustion engine to drive the at least one second rotor; and
- an electric generator to be driven by the internal combustion engine to generate a second electric power; wherein
- the power source includes the electric generator, and the electric generator is connected to the first wiring and the second wiring.

4. The unmanned aerial vehicle according to claim 1, wherein the power supply includes a terminal to supply power to the implement and a terminal to conduct communication with the implement.

5. The unmanned aerial vehicle according to claim 4, further comprising:
- a controller configured or programmed to control output of the external power from the power supply, wherein the controller is configured or programmed to control supply of the external power according to a current operational state or a planned operational state of the implement obtained through the communication.

6. The unmanned aerial vehicle according to claim 1, wherein the unmanned aerial vehicle is configured to fly while towing the implement, and the power supply and the implement are electrically connected by a cable.

7. A system comprising:
- the unmanned aerial vehicle according to claim 1; and
- the implement electrically connected to the power supply of the unmanned aerial vehicle, wherein the implement is an interchangeable implement to perform agricultural work on a field or crops in the field.

* * * * *